US012706861B2

(12) United States Patent
Brar et al.

(10) Patent No.: US 12,706,861 B2
(45) Date of Patent: Aug. 11, 2026

(54) TECHNIQUES OF HANDLING OVERLAY ENCAPSULATION

(71) Applicant: Oracle International Corporation, Redwood Shores, CA (US)

(72) Inventors: Jagwinder Singh Brar, Bellevue, WA (US); David Dale Becker, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 97 days.

(21) Appl. No.: 18/912,385

(22) Filed: Oct. 10, 2024

(65) Prior Publication Data

US 2025/0126071 A1 Apr. 17, 2025

Related U.S. Application Data

(60) Provisional application No. 63/611,948, filed on Dec. 19, 2023, provisional application No. 63/590,269, filed on Oct. 13, 2023.

(51) Int. Cl.
*H04L 47/43* (2022.01)
*G06F 9/455* (2018.01)
(Continued)

(52) U.S. Cl.
CPC ........ *H04L 49/111* (2022.05); *G06F 9/45558* (2013.01); *G06T 1/20* (2013.01); *H04L 41/0816* (2013.01); *H04L 47/263* (2013.01); *H04L 47/43* (2022.05); *H04L 49/255* (2013.01); *H04L 49/256* (2013.01); *H04L 49/70* (2013.01); *G06F 2009/45579* (2013.01);
(Continued)

(58) Field of Classification Search
CPC . G06F 2009/45579; G06F 2009/45595; H04L 41/0816; H04L 47/12; H04L 47/263; H04L 47/43; H04L 49/111; H04L 49/1515; H04L 49/255; H04L 49/256; H04L 49/70
See application file for complete search history.

(56) References Cited

U.S. PATENT DOCUMENTS 11,991,246 B2 5/2024 Shilimkar et al.
12,153,933 B2 11/2024 Adogla
(Continued)

FOREIGN PATENT DOCUMENTS

WO 20221 46470 A1 7/2022

OTHER PUBLICATIONS

Application No. PCT/US2024/050769 , International Search Report and Written Opinion, Mailed on Jan. 28, 2025, 12 pages.
(Continued)

*Primary Examiner* — Gil H. Lee
(74) *Attorney, Agent, or Firm* — Kilpatrick Townsend & Stockton LLP

(57) ABSTRACT

A network environment comprises a plurality of host machines that are communicatively coupled to each other via a network fabric comprising a plurality of switches that in turn include a plurality of ports. Each host machine comprises one or more GPUs that execute customer workloads. Described herein are different approaches that provide for addressing the problem of handling network overlay encapsulation without causing adverse impact to the performance of workloads executed on the GPU clusters.

20 Claims, 20 Drawing Sheets

(51) Int. Cl.

| | |
|---|---|
| ***G06T 1/20*** | (2006.01) |
| ***H04L 41/0816*** | (2022.01) |
| ***H04L 47/263*** | (2022.01) |
| ***H04L 49/00*** | (2022.01) |
| ***H04L 49/111*** | (2022.01) |
| ***H04L 49/25*** | (2022.01) |
| ***H04L 49/253*** | (2022.01) |
| *H04L 49/1515* | (2022.01) |

(52) U.S. Cl.

CPC ............... *G06F 2009/45595* (2013.01); *H04L 49/1515* (2013.01); *H04L 2212/00* (2013.01)

(56) References Cited

U.S. PATENT DOCUMENTS

| | | | | |
|---|---|---|---|---|
| 12,309,061 | B2 | 5/2025 | Brar et al. | |
| 12,327,127 | B2 | 6/2025 | Adogla | |
| 12,375,415 | B2 | 7/2025 | Brar et al. | |
| 12,452,175 | B2 * | 10/2025 | Kabbani | H04L 47/125 |
| 12,531,785 | B2 | 1/2026 | Brar et al. | |
| 2013/0343193 | A1 * | 12/2013 | Kwan | H04L 47/12 370/235 |
| 2017/0093699 | A1 * | 3/2017 | Crupnicoff | H04L 47/263 |
| 2018/0109471 | A1 | 4/2018 | Chang et al. | |
| 2018/0287966 | A1 | 10/2018 | Kamath et al. | |
| 2021/0258362 | A1 | 8/2021 | Hinnant et al. | |
| 2022/0294736 | A1 * | 9/2022 | Yan | H04L 43/0882 |
| 2022/0391348 | A1 | 12/2022 | Cardona | |
| 2022/0417139 | A1 | 12/2022 | Brar et al. | |
| 2023/0214345 | A1 | 7/2023 | Taylor | |
| 2023/0222007 | A1 | 7/2023 | Brar et al. | |
| 2023/0224223 | A1 | 7/2023 | Brar et al. | |
| 2023/0254229 | A1 * | 8/2023 | Shpigelman | H04L 43/0852 370/253 |
| 2023/0344777 | A1 | 10/2023 | Brar et al. | |
| 2023/0396590 | A1 | 12/2023 | Adogla | |
| 2024/0086218 | A1 | 3/2024 | Olazabal et al. | |

OTHER PUBLICATIONS

Application No. PCT/US2024/050776 , International Search Report and Written Opinion, Mailed on Jan. 28, 2025, 25 pages.

Application No. PCT/US2024/050784 , International Search Report and Written Opinion, Mailed on Jan. 28, 2025, 14 pages.

Application No. PCT/US2024/050778, International Search Report and Written Opinion, Mailed on Jan. 31, 2025, 13 pages.

Application No. PCT/US2024/050773, International Search Report and Written Opinion, Mailed on Jan. 31, 2025, 11 pages.

International Application No. PCT/US2024/050779, International Search Report and Written Opinion mailed on Feb. 10, 2025, 13 pages.

U.S. Appl. No. 18/912,076, Non-Final Office Action mailed on Apr. 7, 2026, 45 pages.

U.S. Appl. No. 18/912,251, Non-Final Office Action mailed on Apr. 8, 2026, 8 pages.

International Application No. PCT/US2024/050769, International Preliminary Report on Patentability mailed on Apr. 23, 2026, 9 pages.

International Application No. PCT/US2024/050773, International Preliminary Report on Patentability mailed on Apr. 23, 2026, 10 pages.

International Application No. PCT/US2024/050776, International Preliminary Report on Patentability mailed on Apr. 23, 2026, 10 pages.

International Application No. PCT/US2024/050778, International Preliminary Report on Patentability mailed on Apr. 23, 2026, 9 pages.

International Application No. PCT/US2024/050779, International Preliminary Report on Patentability mailed on Apr. 23, 2026, 10 pages.

International Application No. PCT/US2024/050784, International Preliminary Report on Patentability mailed on Apr. 23, 2026, 11 pages.

* cited by examiner

| $K_{min}$ | $K_{max}$ | Probability $P_{max}$ |
| --- | --- | --- |
| 63,000 | 80,000 | 20% |

FIG. 13

TECHNIQUES OF HANDLING OVERLAY ENCAPSULATION

CROSS-REFERENCES TO RELATED APPLICATIONS

This application is a non-provisional of and claims the benefit of the filing date, of U.S. Provisional Application No. 63/590,269, filed on Oct. 13, 2023, and U.S. Provisional Application No. 63/611,948, filed on Dec. 19, 2023, the contents of each of which are incorporated herein by reference in its entirety for all purposes.

FIELD

The present disclosure relates to a network infrastructure for executing artificial intelligence or machine learning workloads e.g., graphical processing unit (GPU) workloads.

BACKGROUND

Organizations continue to move business applications and databases to the cloud to reduce the cost of purchasing, updating, and maintaining on-premise hardware and software. High performance computing applications consistently consume all of the available computing power to achieve a specific outcome or result. Such applications require dedicated network performance, fast storage, high computing capabilities, and significant amounts of memory-resources that are in short supply in the virtualized infrastructure that constitutes today's commodity clouds.

Cloud infrastructure service providers offer newer and faster graphical processing units (GPUs) to address the requirements of these applications. A GPU workload is typically executed on one or more host machines. As the architectures of a network fabric including the GPUs supports multiple customers, i.e., they are multi-tenanted, it is desired to obtain strong traffic isolation properties between/across multiple customers. This is typically done via encapsulation, where metadata is added to packets in order to uniquely identify each customer's traffic. However, the encapsulation has an adverse effect on throughput. Specifically, the encapsulation amounts to a small (often a fraction of 1%) of throughput impact to customers' traffic. Ultra-high performing RDMA (Remote Direct Memory Access) services that are extremely performance hungry can be negatively impacted due this encapsulation.

Further, RDMA workloads use congestion control protocols (such as DC-QCN) to detect network congestion and respond to congestion by aggressively reducing the throughput. Since this small amount of encapsulation overhead reduces the throughput ever so slightly, RDMA services mistakenly take it as a sign of congestion in the network and cut the throughput by a large factor (e.g., about 50%). This means that a very small amount of encapsulation overhead can significantly lower the throughput of RDMA services. Embodiments discussed herein address these and other issues.

SUMMARY

The present disclosure relates generally to a network infrastructure for executing graphical processing unit (GPU) workloads. Various embodiments are described herein, including methods, systems, non-transitory computer-readable media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

One embodiment of the present disclosure is directed to a method comprising: in a network fabric comprising a plurality of host machines that are communicatively coupled to each other via a network fabric comprising a plurality of switches, receiving, by a source host machine, a first packet from a first switch included in the plurality of switches, the first packet indicative of an occurrence of congestion in the network fabric; configuring, by the source host machine, in response to receiving the first packet, a network interface card associated with a GPU included in the source host machine, the configuring comprising reducing a transmission rate of the GPU by a first predetermined amount; responsive to receiving by the source host machine a second packet from the first switch, wherein the second packet indicates presence of congestion in the network fabric, reconfiguring, by the source host machine, the network interface card associated with the GPU, the reconfiguring comprising further reducing the transmission rate of the GPU by a second predetermined amount; and responsive to not receiving the second packet, modifying by the source host machine, the transmission rate of the GPU to correspond to an initial transmission rate of the GPU prior to receiving the first packet.

An aspect of the present disclosure provides for a computing device comprising one or more data processors, and a non-transitory computer-readable storage medium containing instructions which, when executed on the one or more data processors, cause the one or more data processors to perform part or all of one or more methods disclosed herein.

Another aspect of the present disclosure provides for one or more computer readable non-transitory media storing computer-executable instructions that, when executed by one or more processors, cause to perform part or all of one or more methods disclosed herein.

The foregoing, together with other features and embodiments, will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

FIG. 13 depicts a table illustrating different parameter settings according to certain embodiments.

DETAILED DESCRIPTION

Figure 1:
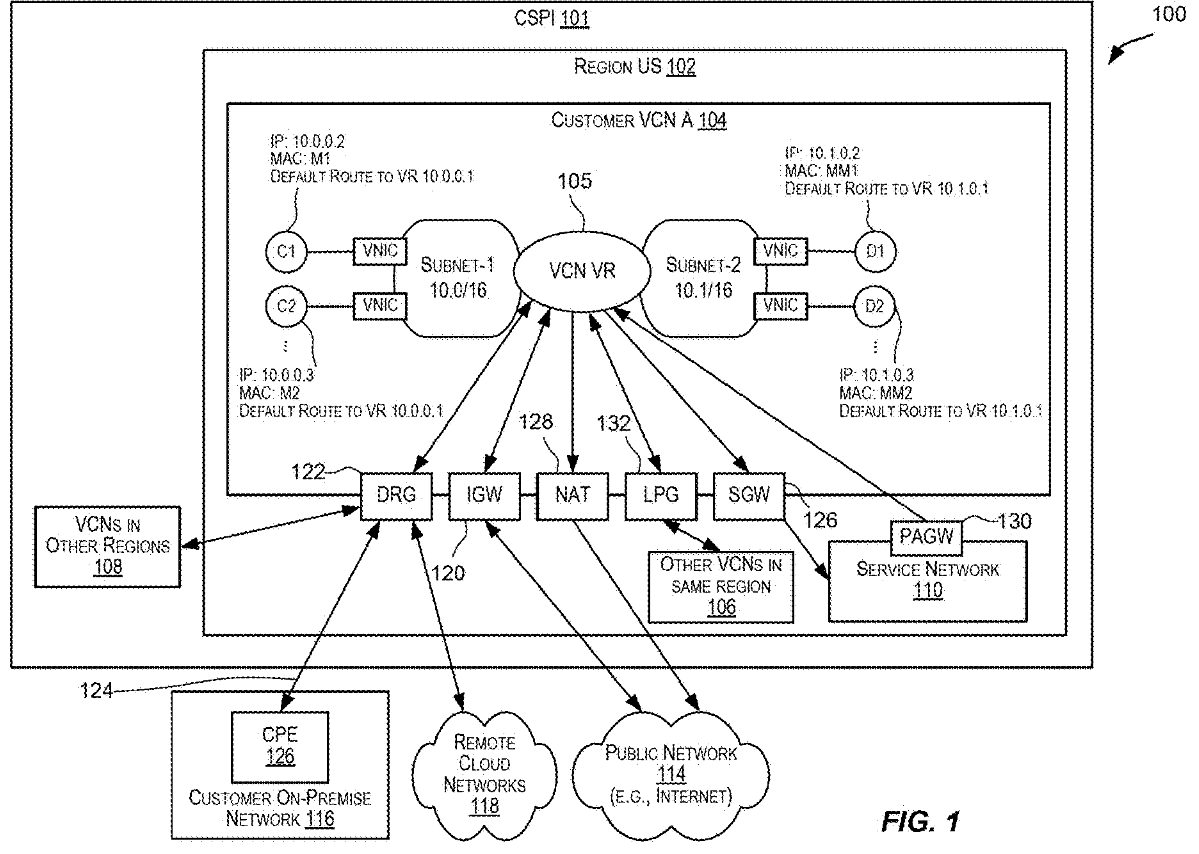
FIG. 1 is a high-level diagram of a distributed environment showing a virtual or overlay cloud network hosted by a cloud service provider infrastructure, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Architecture of Cloud Infrastructure

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premises servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE))

Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken, and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions, and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premises networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP), and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 6, 7, 8, and 9 (see references 616, 716, 816, and 916) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, and 18-22, and are described below. FIG. 1 is a high-level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN c/o Oracle International Corporation for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premises network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 18, 19, 20, and 21 (for example, gateways referenced by reference numbers 1834, 1836, 1838, 1934, 1936, 1938, 2034, 2036, 2038, 2134, 2136, and 2138) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features' associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked, and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
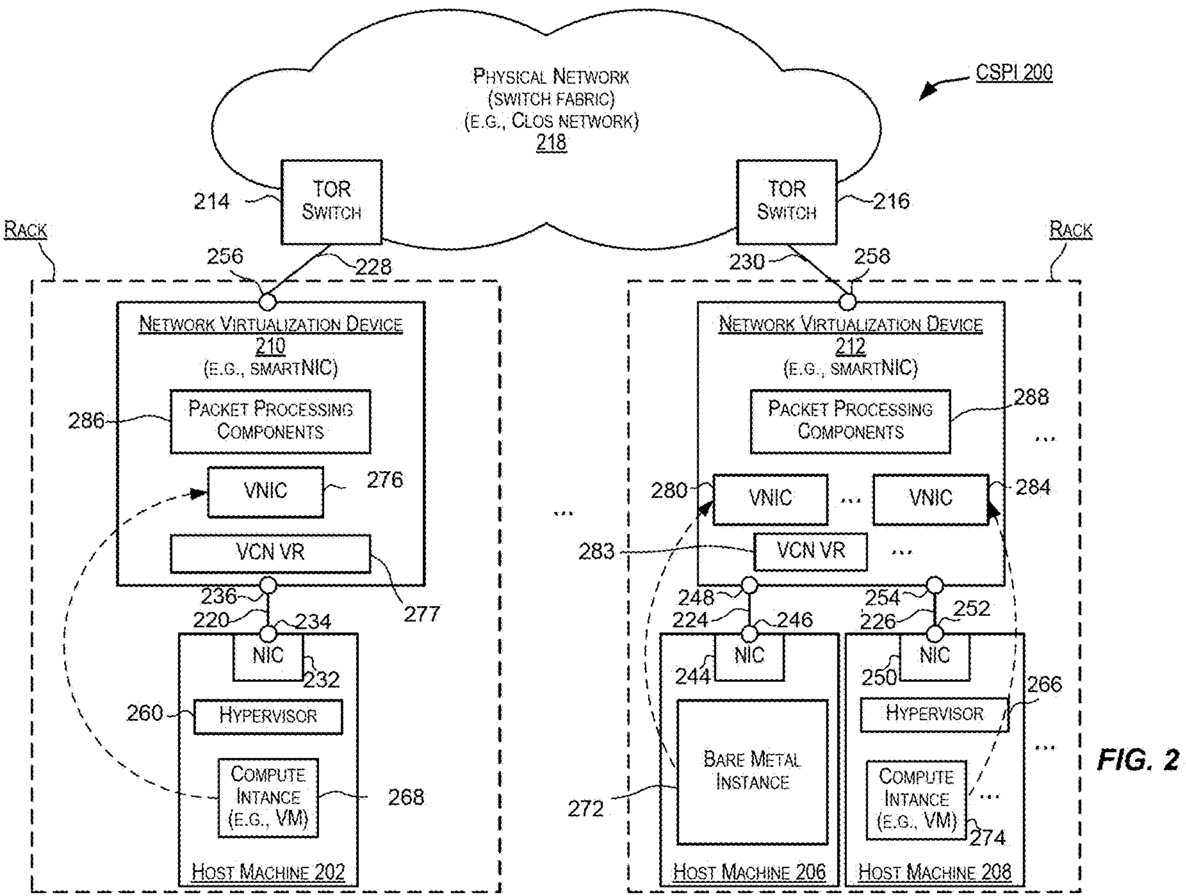
FIG. 2 depicts a simplified architectural diagram of the physical components in the physical network within CSPI, according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
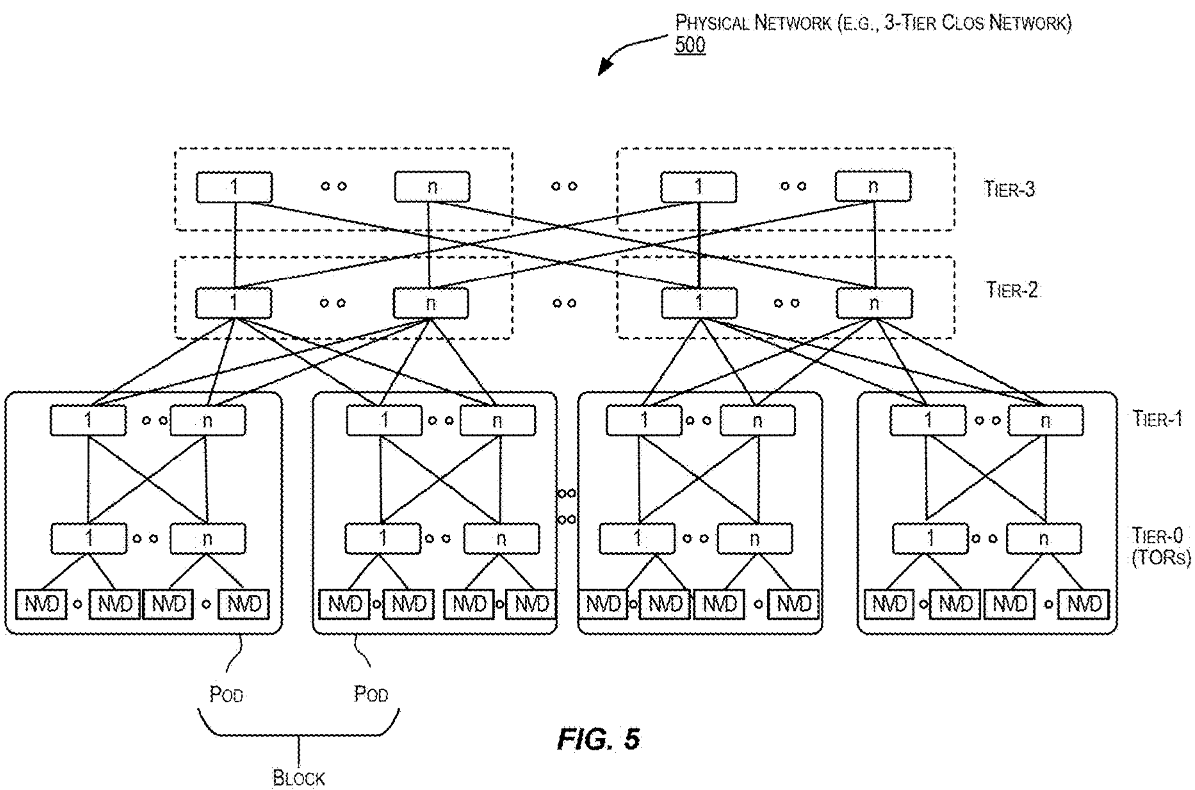
FIG. 5 depicts a simplified block diagram of a physical network provided by a CSPI, according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
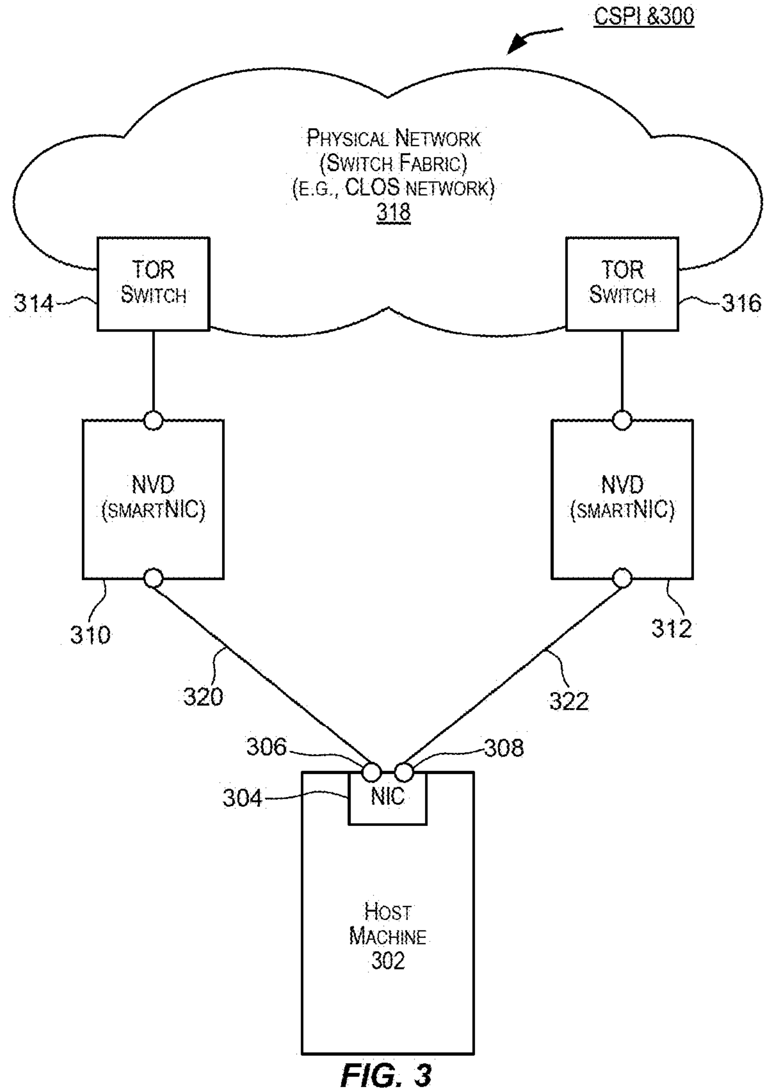
FIG. 3 shows an example arrangement within CSPI where a host machine is connected to multiple network virtualization devices (NVDs), according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320 and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch, or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two endpoints (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 18, 19, 20, and 21 (see references 1816, 1916, 2016, and 2116) and described below. Examples of a VCN Data Plane are depicted in FIGS. 18, 19, 20, and 21 (see references 1818, 1918, 2018, and 2118) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206 and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200 or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
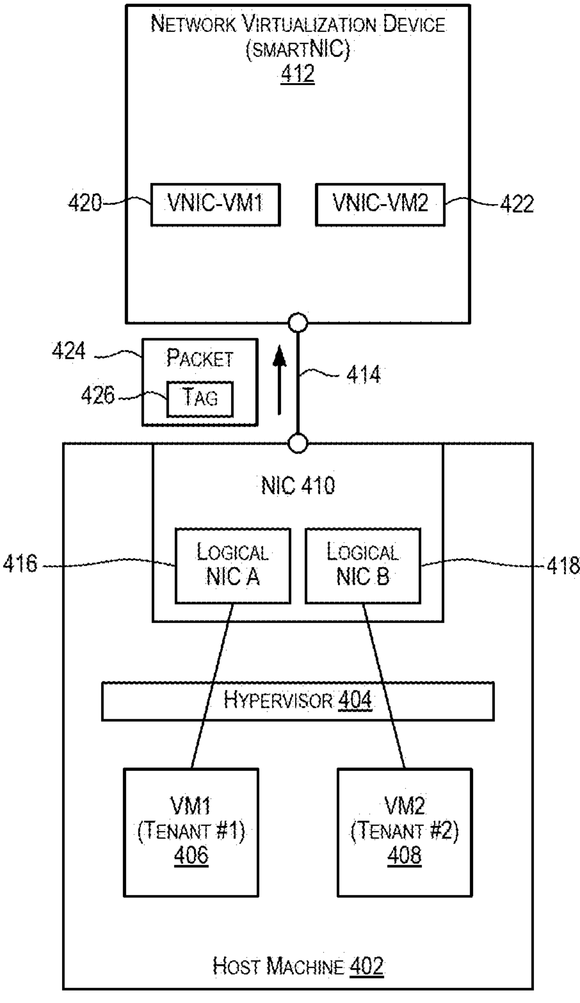
FIG. 4 depicts connectivity between a host machine and an NVD for providing I/O virtualization for supporting multitenancy, according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-O-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>. [REGION][.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

Global Virtual Planes

Cloud infrastructure service providers offer newer and faster graphical processing units (GPUs) to address the ever growing demands (e.g., bandwidth demands) of high performance computer applications. A GPU workload is typically executed on one or more host machines. Typically, such workloads are not able to achieve an expected level of throughput. One factor for this problem is the lack of flow entropy e.g., equal cost multi-path (ECMP) flow entropy. In ECMP, multiple flows (e.g., from different host machines) may get hashed in a manner such that both flows are expected to traverse a same outgoing link/port of a switch.

Furthermore, the problem is worsened by the fact that host machines exchange traffic without regard for which other hosts are in their local network neighborhood. Such situations often lead to bandwidth contention issues that are typically referred to in the literature as flow collision based congestion problems.

Details regarding the problems incurred by ECMP flow entropy are described below with reference to FIG. 6. To address the problems posed by ECMP flow entropy, by some embodiments of the present disclosure, there is provided a novel concept (referred to herein as 'global virtual planes') that eliminates ECMP traffic load balancing decisions on switches, thereby providing a significant improvement in throughput. In other words, the present disclosure provides for a scalable networking solution for executing GPU workloads in a hierarchical network configuration (e.g., a 2-tier or a 3-tier CLOS network configuration). The present solution avoids (i.e., eliminates) ECMP based traffic load balancing decisions thereby avoiding the flow hash collision problem which causes network congestion. As a result, the workloads can achieve a theoretical maximum network performance. Details regarding the scalable networking solution is described below with references to FIGS. 7-9.

Figure 6:
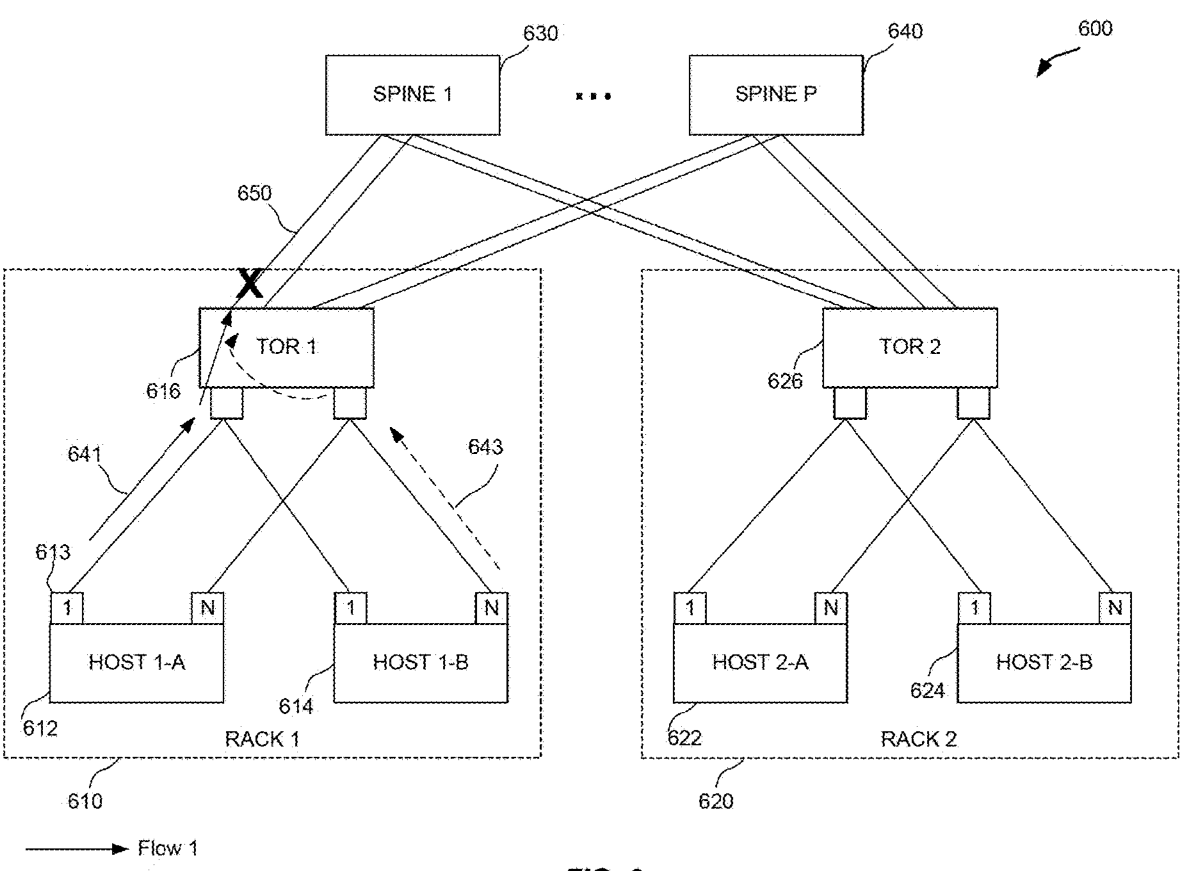
FIG. 6 depicts a simplified block diagram of a cloud infrastructure incorporating a CLOS network arrangement, according to certain embodiments.

FIG. 6 depicts a block diagram of a cloud infrastructure 600 incorporating a CLOS network arrangement, according to certain embodiments. The cloud infrastructure 600 includes a plurality of racks (e.g., rack 1 610, and rack 2, 620). Each rack includes a plurality of host machines (also referred to herein as hosts). Rack 1 610 is depicted as including two host machines, i.e., host 1-A 612 and host 1-B 614, and rack 2 620 is depicted as including two host machines, i.e., host 2-A 622 and host 2-B 624. It is appreciated that the illustration in FIG. 6 (i.e., each rack including two host machines) is intended to be illustrative and non-limiting. For instance, the cloud infratsructure may include more than two racks, where each rack may include more than two host machines. Moreover, it is noted that each rack is not restricted to having the same number of hosts. Rather, a rack may have a higher or lower number of host machines as compared to the number of host machines included in another rack.

Each host machine includes a plurality of graphical processing units (GPUs). For instance, host machine 1-A 612 includes N GPUs e.g., GPU 1, 613. Moreover, it is appreciated that the illustration in FIG. 6 of having each host machine including the same number of GPUs, i.e., N GPUs, is intended to be illustrative and non-limiting, i.e., each host machine can include a different number of GPUs. Each rack includes a top of rack (TOR) switch that is communicatively coupled with the GPUs hosted on the host machines within the rack. For example, rack 1 610 includes a TOR switch (i.e., TOR 1) 616 that is communicatively coupled to host machines Host 1-A, 612 and host 1-B, 614, whereas rack 2 620 includes a TOR switch (i.e., TOR 2) 626 that is communicatively coupled to host machines Host 2-A, 622 and host 2-B, 624. It is appreciated that the TOR switches depicted in FIG. 6 (i.e., TOR 1 616, and TOR 2 626), each include N ports that are used to communicatively couple the TOR switch to the N GPUs hosted on each host machine included in the rack. The coupling of TOR switches to the GPUs as depicted in FIG. 6 is intended to be illustrative and non-limiting. For instance, in some embodiments, the TOR switch may have a plurality of ports, each of which corresponds to a GPU on each host machine, i.e., a GPU on a host machine may be connected to a unique port of the TOR via a communication link.

The TOR switches from each rack are communicatively coupled to a plurality of spine switches (also referred to herein as upper layer switches) e.g., spine switch 1, 630 and spine switch P 640. For example, as shown in FIG. 6, TOR 1, 616 is connected to spine switch 1 630 via two links, and to spine switch P 640 via another two links, respectively. Information transmitted from a particular TOR switch to a spine switch is referred to herein as communication conducted via uplinks, whereas information transmitted from a spine switch to a TOR switch is referred to herein as communication conducted via downlinks. According to some embodiments, the TOR switches and the spine switches are connected in a CLOS network arrangement (e.g., a multi-stage switching network), where each TOR switch forms a 'leaf' node in the CLOS network.

According to some embodiments, the GPUs included in the host machines execute tasks related to machine learning. In such a setting, a single task may be performed/spread across a large number of GPUs (e.g., 64 GPUs) that could be spread across multiple host machines and across multiple racks. Since all these GPUs are working on the same task (i.e., a workload), they all need to communicate with each other in a time synchronized manner. Furthermore, at any given time, the GPUs are either in one of a compute mode or a communication mode, i.e., GPUs talk to one another at roughly the same time. The speed of the workload is determined by the speed of the slowest GPU.

Typically, to route packets from a source GPU to a destination GPU, equal cost multipath (ECMP) routing is utilized. In ECMP routing, when there are multiple equal cost paths available for routing traffic from a sender to a receiver, a selection technique is used to select a particular path. Accordingly, at a network device (e.g., a TOR switch or a spine switch) receiving the traffic, a selection algorithm is used to select an outgoing link to be used for forwarding the traffic from the network device to a subsequent device. This outgoing link selection occurs at each network device in the path from the sender to the receiver. Hash-based selection is a widely used ECMP selection technique, where the hash may be based, for example, on a 4-tuple of a packet (e.g., source port, destination port, source IP, destination IP).

ECMP routing is a flow aware routing technique, where each flow (i.e., a stream of data packets) is hashed to the same path for the duration of the flow. Thus, packets in a flow are forwarded from a network device using a particular outgoing port/link. This is typically done in order to ensure that packets in a flow arrive in order, i.e., no re-ordering of packets is required. However, ECMP routing is bandwidth (or throughput) unaware. In other words, the TOR and spine switches perform statistical flow-aware (throughput unaware) ECMP load balancing of flows on parallel links.

In standard ECMP routing (i.e., only flow aware routing), a problem is that flows received by a network device over two separate incoming links may get hashed to the same outgoing link, thereby resulting in a flow collision. For instance, consider a situation where the two flows are coming in over two separate incoming 100G links, and each of the flows gets hashed to the same 100G outgoing link. Such a situation results in a congestion (i.e., flow collision) and results in packets being dropped, since the incoming bandwidth is 200G, but outgoing bandwidth is 100G. As shown in FIG. 6, there are two flows: flow 1 641 which is directed from a first GPU of the host machine host 1-A, 612 to the TOR switch 616, and flow 2 643, which is directed from another GPU on the host machine 614 to the TOR switch 616. Note that the two flows are directed to the TOR switch on separate links. It is assumed that all links depicted in FIG. 6 have a capacity (i.e., bandwidth) of 100G. In the case when the TOR switch 616 performs ECMP routing algorithm, it is possible that the two flows get hashed to use the same outgoing link of the TOR e.g., link 650 connecting the TOR switch 616 to spine switch 630. In this case, there is a collision between the two flows (represented by 'X' mark), which results in packets being dropped.

Such a collision scenario is generally problematic for all types of traffic irrespective of the protocol. For example, TCP is intelligent in that when a packet gets dropped and the sender does not get an acknowledgment for that dropped packet, the packet is re-transmitted. However, the situation is worsened for remote direct memory access (RDMA) type traffic. RDMA networks do not use TCP for a variety of reasons (e.g., TCP has complex logic that does not lend well to low latency and high performance). RDMA networks use protocols, such as RDMA over Infiniband or RDMA over converged Ethernet (RoCE). In RoCE, there is a congestion control algorithm, wherein when a sender identifies the occurrence of a congestion or dropped packets, the sender slows down the transmission of packets. For a dropped packet, not only the dropped packets, but also several packets around the dropped packet are retransmitted, which further cats away the available bandwidth and results in poor performance.

Thus, the flow collision issue is a critical problem for workload execution e.g., GPU workloads, due to the stringent time synchronization requirements. Described herein is a scalable networking solution for executing GPU workloads in a 2-tier or 3-tier CLOS network configuration. The present solution avoids (i.e., eliminates) ECMP based traffic load balancing decision of ToR switches. Stated differently, the present solution eliminates the flow hash collision problem which causes network congestion. As a result, the workloads can achieve a theoretical maximum network performance.

Figure 7:
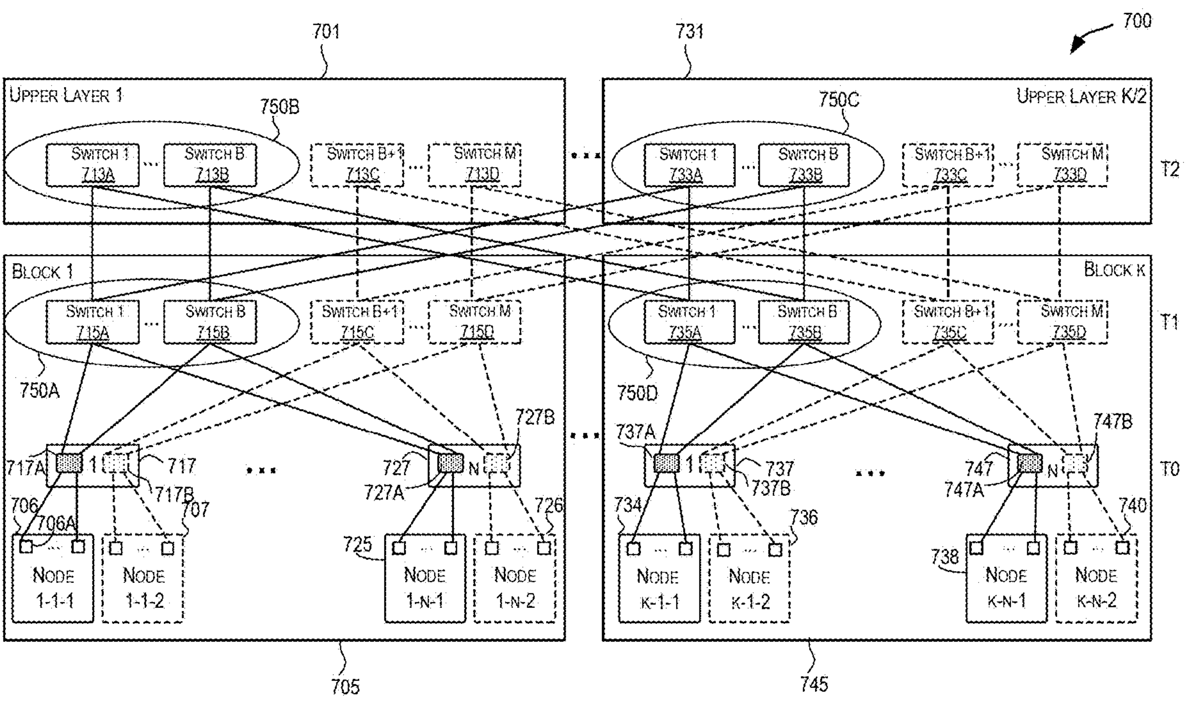
FIG. 7 depicts an exemplary network fabric illustrating the concept of global virtual planes, according to certain embodiments.

Turning now to FIG. 7, there is depicted an exemplary network fabric 700 illustrating the concept of global virtual planes, according to certain embodiments. The network fabric 700 includes a plurality of host machines (labeled as nodes) that are communicatively coupled to each other via a plurality of switches. Each host machine includes one or more GPUs. The one or more GPUs of each host machine may be configured to execute artificial intelligence or machine learning workloads. The plurality of switches is arranged in a hierarchical structure e.g., a CLOS network architecture such as a 2-tier or a 3-tier CLOS network. In one embodiment, the network fabric 700 includes a 3-tiered structure of switches including a first tier of switches (T0), a second tier of switches (T1), and a third tier of switches (T2).

In one implementation, the network fabric is provided as a plurality of blocks. For instance, as shown in FIG. 7, the network fabric 700 includes K blocks i.e., block 1, 705 to block K, 745. Each block includes a plurality of host machines, a plurality of first tier of switches, and a plurality of second tier of switches. For example, block 705 includes 'N' first tier switches (T0) labeled 717 and 727, respectively. Further, block 705 includes 'M' second tier switches (T1) labeled 715A, 715B, 715C, and 715D. As shown in FIG. 7, a plurality of host machines is directly coupled to each switch in the first tier of switches. For example, host machines 706 and 707 are directly coupled to the first tier switch 717, and host machines 725 and 726 are coupled to the first tier switch 727.

It is noted that each host machine (i.e., node) can be represented by a tuple including three identifiers (x-y-z), where identifier 'x' corresponds to an ID of a block in which the host machine is included, identifier 'y' corresponds to an ID of the first tier (T0) switch to which the host machine is directly coupled to, and identifier 'z' corresponds to an identifier of the host machine. Each host machine may include one or more GPUs e.g., GPU 706A included in host machine labeled 1-1-1. Furthermore, as shown in FIG. 7, the N first tier switches (i.e., 717, 727) communicatively couple the plurality of host machines to the M second tier switches e.g., switches 715A, 715B, 715C, and 715D.

Block K 745 has a similar configuration as that of block 705. For example, block 745 includes 'N' first tier switches (T0) labeled 737 and 747, respectively. Further, block 745 includes 'M' second tier switches (T1) labeled 735A, 735B, 735C, and 735D. As shown in FIG. 7, a plurality of host machines is directly coupled to each switch in the first tier of switches. For example, host machines 734 and 736 are directly coupled to the first tier switch 737, and host machines 738 and 740 are coupled to the first tier switch 747. Furthermore, as shown in FIG. 7, the N first tier switches (i.e., 734 and 747) communicatively couple the plurality of host machines to the M second tier switches e.g., switches 735A, 735B, 735C, and 735D. It is noted that although FIG. 7 depicts two host machines being directly coupled to each switch included in the first tier of switches, this is not intended to be limiting. Rather, each switch included in the first tier of switches may have a higher number of host machines being coupled to each switch.

Further, the network fabric includes a plurality of groups of upper layer switches e.g., upper layer 1 of switches 701 and upper layer K/2 of switches 731. Each group in the upper layer of switches includes a plurality of third tier of switches (T2). For example, the upper layer 1 of switches 701 includes 'M' tier 3 switches labeled 713A, 713B, 713C, and 713D. Similarly, the upper layer K/2 of switches includes M tier-3 switches labeled 733A, 733B, 733C, and 733D. The tier-3 layer of switches communicatively couples the different blocks included in the network fabric.

As stated previously, the present disclosure provides for a novel concept referred to as 'global virtual planes'. A goal of implementing global virtual planes (also referred to herein as 'virtual planes') is that it eliminates ECMP traffic load balancing decisions on switches, thereby providing a significant improvement in throughput. According to some embodiments, virtual planes are established as follows—the resources of the entire network fabric 700 are partitioned into a number of portions. Each portion is assigned/associated with a virtual plane. In other words, the resources of the network fabric may correspond to the plurality of switches included in the hierarchical structure of switches i.e., T0, T1, and T2 layer switches. Each switch includes a plurality of ports. Thus, the network fabric as a whole can be construed to include a plurality of switches having a plurality of ports. In one implementation, a first subset of ports from the plurality of ports is associated with a virtual plane (e.g., a first virtual plane). The first virtual plane thus identifies/corresponds to a first collection of resources that are to be exclusively used for communicating packets from/to host machines that are associated with the first virtual plane. Resources associated with the first virtual plane may include: (i) a first subset of ports of each switch included in the first tier of switches (ii) a first subset of switches included in the second tier of switches, and (iii) a first subset of switches included in the third tier of switches.

In a similar manner, a second subset of ports from the plurality of ports included in the network fabric is associated with another virtual plane (e.g., a second virtual plane). The second virtual plane thus identifies/corresponds to a second collection of resources that are to be exclusively used for communicating packets from/to host machines that are associated with the second virtual plane. Resources associated with the second virtual plane may include: (i) a second subset of ports of each switch included in the first tier of switches (ii) a second subset of switches included in the second tier of switches, and (iii) a second subset of switches included in the third tier of switches. It is noted that each of the above described three resources associated with the first virtual plane are different than the three resources associated with the second virtual plane.

As an example, considering a first tier switch (T0) 717, it can be seen that the ports of the switch are partitioned into two portions i.e., ports 717A and ports 717B. Similarly, the ports of the switch 727 are partitioned in two portions i.e., ports 727A and ports 727B, whereas ports of switches 737 and 747 (included in block K) are portioned into ports 737A and ports 737B, and ports 747A and ports 747B, respectively. The ports labeled 717A, 727A (of switches included in block 1) and ports labeled 737A and 747A (of switches included in block K) are associated with a first global virtual plane. In contrast, ports labeled 717B, 727B, 737B, and 747B (of the first tier of switches) are associated with the second virtual plane.

Further, out of the 'M' second tier switches (i.e., 715A, 715B, 715C, and 715D) included in block 1 705, a first subset of switches (represented as 750A) e.g., switch 1 715A to switch B 715B can be associated with the first virtual plane. Similarly, out of the 'M' second tier switches (i.e., 735A, 735B, 735C, and 735D) included in block K 745, a first subset of switches (represented as 750D) e.g., switch 1 735A to switch B 735B are associated with the first virtual plane. In a similar manner, a subset of switches included in the upper layer of switches i.e., third tier of switches can be assigned to the first virtual plane e.g., group of switches represented as 750B and 750C. Similarly, the second tier switches 715C, 715D, 735C, and 735D and the upper layer switches i.e., 713C, 713D, 733C, and 733D are associated with the second virtual plane. It is appreciated that when a particular switch in the second tier of switches (or the third tier of switches) is associated to a particular virtual plane, it means that all of the ports of the particular switch i.e., uplink ports and downlink ports are associated with the particular virtual plane.

Further, each first tier switch has a plurality of host machines that are directly coupled to the switch. In one implementation, each host machine is allocated to a different virtual plane. For example, as shown in FIG. 7, host machines 706, 725, 737, and 747 are associated with the first virtual plane. The host machines as well as the resources associated with the first virtual plane are depicted in FIG. 7 using solid lines. In a similar manner, host machines and resources associated with another virtual plane (e.g., the second virtual plane) are depicted in FIG. 7 using dotted lines. According to some embodiments, a number of virtual planes that can be supported by the network fabric corresponds to a number of host machines that are directly coupled to a switch included in the first tier of switches. For example, as shown in FIG. 7, each of the first tier of switches includes two host machines coupled to the switch. Thus, a total of two global virtual planes are depicted in FIG. 7. It is noted that two global virtual planes are depicted in FIG. 7 for illustrative purposes only. The network fabric may support a higher number of global virtual planes.

Thus, in the framework described above, it is noted that each virtual plane is associated with a unique set of resources i.e., ports of switches included in the first tier of switches, as well as a unique set of switches (i.e., uplink & downlink ports of the switches) in the T1 and T2 layer of switches. Further, port-to-port traffic forwarding is implemented at each tier within the network fabric. Doing so, results in traffic on a particular virtual plane remaining on the same virtual plane in an end-to-end manner. Thus, if a particular GPU on a particular host machine desires to communicate with another GPU on another host machine (assuming both host machines are associated to the same virtual plane), an end-to-end path (i.e., referred to herein as a "traffic path" within a virtual plane and described later with reference to FIG. 8) is pre-established. Furthermore, it is appreciated that within a global virtual plane, the port-to-port traffic forwarding may be accomplished by predetermining a path of the traffic. This can be achieved by policy based routing mechanisms, static routing mechanisms, and/or some hardware forwarding rules akin to Open Flow.

In this manner, a host machine assigned to a particular virtual plane is restricted to utilize only the resources associated with that virtual plane in communicating packets to other host machines associated with that virtual plane. Stated differently, a first host machine associated with a first virtual plane is not permitted to communicate with a second host machine that is associated with a second virtual plane. In this manner, traffic isolation between different customers can be achieved by allocating host machines associated with different virtual planes to the different customers. It is noted that in the network fabric of FIG. 7, there is no requirement for ECMP traffic load-balancing decisions to be made on the T0, T1 or T2 tier switches. In other words, for traffic between different GPUs, this network design eliminates flow hash collision which causes congestion. In this manner, workloads can achieve a theoretical maximum network performance.

Figure 8:
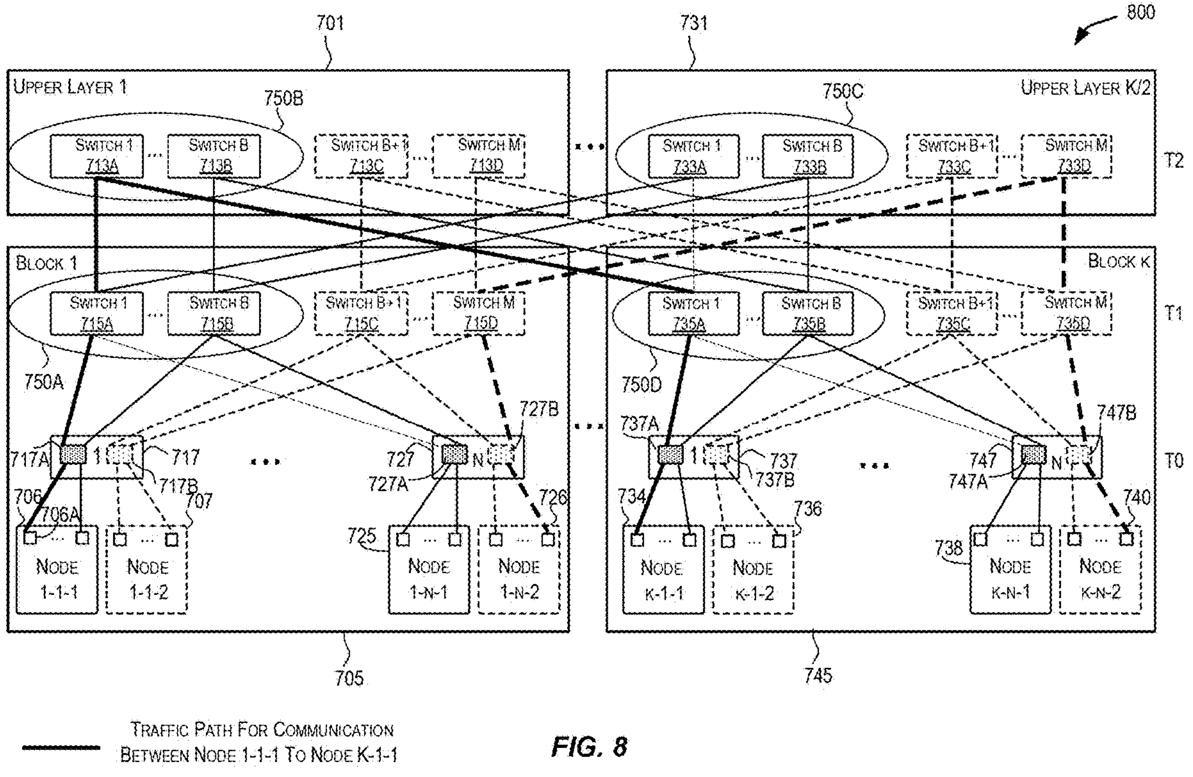
FIG. 8 depicts an exemplary network fabric illustrating traffic paths established within global virtual planes, according to certain embodiments.

FIG. 8 depicts an exemplary network fabric 800 illustrating traffic paths established within global virtual planes, according to certain embodiments. For instance, a first traffic path (shown by bold lines) represents a traffic path (that may be predetermined using a port-to-port traffic forwarding mechanism) for communicating packets originating from host machine 1-1-1 (706) i.e., source host machine, and terminating at host machine K-1-1 (734) i.e., destination host machine. In a similar manner, host machine 1-N-1 (725) can communicate, for instance, with node K-N-1 (738), both of which are associated with the first virtual plane, by using a different set of resources than used by the first traffic path. In other words, different traffic paths included in the first virtual plane use non-overlapping (or distinct) resources to communicate traffic. Furthermore, FIG. 8 depicts another traffic path (e.g., a second traffic path) that is established from node 1-N-2 (726) to node K-N-2 (740) that is depicted by dashed lines. It is appreciated that the second traffic path does not utilize any resource in the network fabric that is allocated to the first virtual plane.

Figure 9:
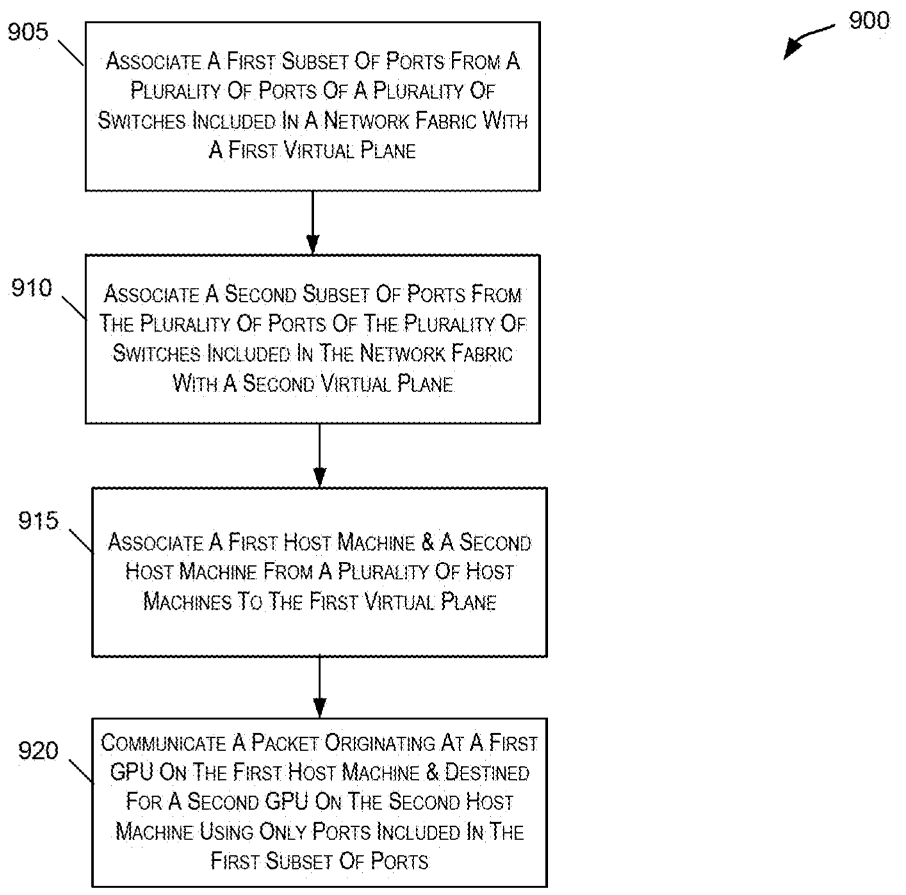
FIG. 9 illustrates an exemplary flowchart depicting steps performed in communicating a packet using a network infrastructure according to certain embodiments.

FIG. 9 illustrates an exemplary flowchart 900 depicting steps performed in communicating a packet using a network infrastructure of FIG. 7, according to certain embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method 900 presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. It is appreciated that a control plane of the network infrastructure may be configured to perform the steps depicted in FIG. 9.

The steps depicted in FIG. 9 may be implemented in a network environment that comprises a plurality of host machines, where each host machine is communicatively coupled to other host machines other via a network fabric. Each host machine includes one or more GPUs. In one implementation, the network fabric may comprise a plurality of switches (including a plurality of ports) that are arranged in a hierarchical structure such as a 2-tier CLOS network or a 3-tier CLOS. Considering the 3-tier CLOS network for sake of illustration, the network fabric may include a first tier of switches, a second tier of switches, and a third tier of switches. In one implementation, the plurality of host machines is directly coupled to switches included in the first tier of switches. The second tier of switches in turn communicatively couples the first tier of switches to the third tier of switches.

In such a setting and as shown in FIG. 9, the process commences in step 905 where a first subset of ports from the plurality of ports is associated with a first virtual plane. The first virtual plane identifies a first collection of resources that are to be exclusively used for communicating packets from and to host machines associated with the first virtual plane. The process then proceeds to step 910, where a second subset of ports from the plurality of ports are associated with a second virtual plane. It is noted that the second virtual plane is different from the first virtual plane.

Thereafter, in step 915, a first host machine and a second host machine from the plurality of host machines are each associated with the first virtual plane. In step 920, for a packet originating at a first GPU on the first host machine and destined for a second GPU on the second host machine, the packet is communicated from the first GPU on the first host machine to the second GPU on the second host machine using only ports from the first subset of ports. For example, referring to FIG. 8, consider the transmission of a packet from a GPU on a first host machine (e.g., Node 1-1-1 (706)) to a GPU on a second host machine (e.g., Node K-1-1 (734)). Note that each of the host machines 706 and 734 are associated with a first virtual plane. It is appreciated that the transmission of the packet exclusively uses resources associated with the first virtual plane i.e., one of the ports 717A associated with the first tier switch 717, one of the ports of switch 715A (i.e., a second tier switch), one of the ports of switch 713A (i.e., a third tier switch), one of the ports of switch 735A (i.e., another second tier switch), and one of the ports 737A associated with another first tier switch 734.

Handling Overhead of Network Overlay Encapsulation

Cloud infrastructure service providers offer newer and faster graphical processing units (GPUs) to address the requirements of high performance computing applications. A GPU workload is typically executed on one or more host machines. As the network fabrics (e.g., network fabric of FIG. 7 and FIG. 10 described below) support multiple customers, i.e., they are multi-tenanted, it is desired to obtain strong traffic isolation properties between/across multiple customers. This is typically done via encapsulation, where metadata is added (e.g., by a T0 switch) to packets in order to uniquely identify each customer's traffic. However, the encapsulation has an adverse effect on throughput. Specifically, the encapsulation amounts to a small (often a fraction of 1%) of throughput impact to customers' traffic. Ultra-high performing RDMA (Remote Direct Memory Access) services that are extremely performance hungry can be negatively impacted due such encapsulation.

Further, RDMA workloads use congestion control protocols (such as DC-QCN) to detect network congestion and respond to congestion by aggressively reducing the throughput. Since this small amount of encapsulation overhead reduces the throughput ever so slightly, RDMA services mistakenly take it as a sign of congestion in the network and cut the throughput by a large factor (e.g., about 50%). This means that a very small amount of encapsulation overhead can significantly lower the throughput of RDMA services. Discussed below are various mechanisms to address the above stated problems. Specifically, there are provided different mechanisms of handling overhead of network overlay encapsulation without causing adverse impact to the performance of workloads executed on the GPUs.

Figure 10:
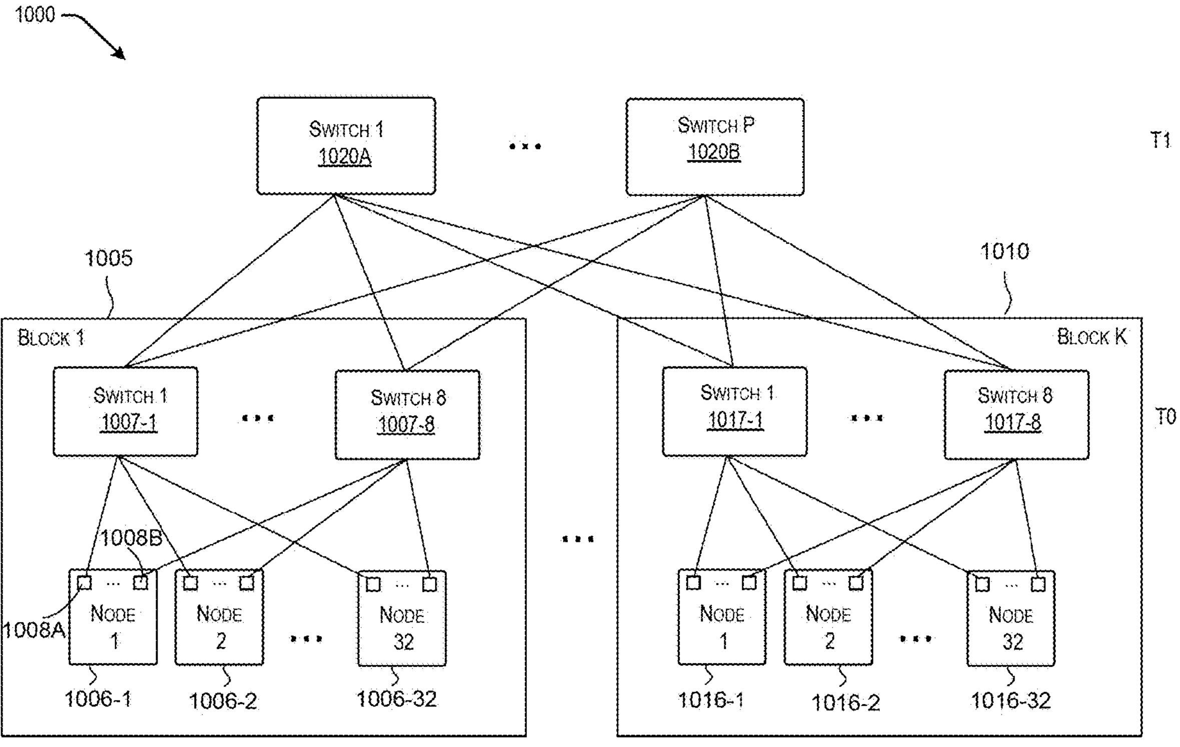
FIG. 10 depicts an exemplary network fabric including GPU clusters, according to certain embodiments.

FIG. 10 depicts an exemplary network fabric 1000 including GPU clusters, according to certain embodiments. As shown in FIG. 10, the network fabric is arranged in a plurality of blocks e.g., block 1 1005-block K 1010. Each block includes a plurality of switches e.g., block 1 1005 includes switches labeled 1007-1 to 1007-8. Similarly, block K 1010 includes switches labeled 1017-1 to 1017-8. It is noted that each block is depicted as including eight switches. This is for illustrative purposes only and is not intended to limit the scope of the present disclosure. Rather, each block may include a higher or a lower number of switches.

According to some embodiments, the switches 1007-1 to 1007-8 and 1017-1 to 1017-8 form a first tier of switches (T0) in a hierarchical structure of switches. Further, each block includes a plurality of host machines e.g., block 1 1005 includes host machines labeled 1006-1, 1006-2, 1006-32 that are directly coupled to the first tier switches. Similarly, block K 1010 includes host machines labeled 1016-1, 1016-2, 1016-32 that are directly coupled to switches included in the first tier of switches. Each host machine e.g., host machine 1006-1 includes a plurality of GPUs that are configured to execute customer workloads. For example, host machine 1006-1 may include eight GPUs (labeled 1008A, 1008B). It is appreciated that each block is depicted as including thirty two host machines (also referred to herein as nodes). This is again for illustrative purposes only and is not intended to limit the scope of the present disclosure.

As shown in FIG. 10, the plurality of switches included in the first tier of switches (in each block) are communicatively coupled to a plurality of switches included in a second tier of switches (T1). For instance, the second tier of switches includes switches labeled 1020A, 1020B that are communicatively coupled to the first tier of switches. Thus, the network fabric 1000 depicted in FIG. 10 corresponds to a two-tier network of switches (e.g., a 2-tier CLOS network), where the first tier switches couple the host machines to the second tier of switches.

Considering host machine 1006-1 as an example, it is noted that each GPU (e.g., 1008A, 1008B) included in the host machine is coupled to a unique first tier switch in the network fabric. Stated differently, a first GPU in each of the thirty two host machines included in block 1 1005, are coupled to the same first tier switch e.g., switch 1007-1. Such an architecture allows for many host machines on a single switch to send traffic to another host machine on the same switch with exactly the same network latency (as cable lengths are virtually identical and the number of switch hop count is exactly identical). Specifically, referring to FIG. 10, a total of 31 host machines could potentially send traffic to 1 host machine at the same time. This phenomenon is referred to herein as an "Incast" phenomenon. The Incast phenomenon may cause a high rate of congestion. Further, the high congestion events lead to switches marking ECN packets i.e., explicit congestion notification packets, which cause receiving host machines (e.g., a destination host machine) to generate (and send) congestion notification packets (CNP) towards the source host machine. This in-turn cause the source host machine to invoke DC-QCN congestion control mechanisms. It is noted that traditional DC-QCN congestion control mechanism is designed to cut the rate (i.e., a transmission rate) in an exponential manner. Thus, it takes a large amount of time in increasing the transmission rate back to a 100% (i.e., full transmission rate). The end result is that workloads that have a high rate of Incast (e.g., in an all-to-all traffic scenario) end up having poor throughput.

In what follows, there is initially provided a brief description of the standard/traditional DC-QCN mechanism followed by a detailed description of the different novel techniques according to the present disclosure to address the above stated problem(s). Specifically, by a first embodiment, there is provided a novel congestion control mechanism (referred to herein as a Modified DC-QCN) and, by a second embodiment, there is provided a flow control mechanism referred to herein a Transmit Priority Flow Control (TxPFC).

Remote Direct Memory Access (RDMA) provides high throughput and ultra-low latency, with low CPU overhead that is necessary for modern datacenter applications. RDMA is deployed on Ethernet using the RDMA over converged Ethernet (RoCE) protocol, which relies on Priority-based Flow Control (PFC) to enable a lossless (i.e., packet drop free) network. Data Center Quantized Congestion Notification (DC-QCN) is an end-to-end congestion control scheme for RoCE. DC-QCN is supported by combining Explicit Congestion Notification (ECN) and PFC to overcome the limitations of PFC to support end-to-end lossless network.

Priority-based Flow Control (PFC) is a lossless transport and congestion relief feature that works by providing granular link-level flow control for each traffic flow (having a priority) on a full-duplex Ethernet link. When the receive buffer on a switch interface fills to a threshold, the switch transmits a pause frame to the sender (the connected peer) to temporarily stop the sender from transmitting more frames. It is noted that the buffer threshold must be low enough so that the sender has time to stop transmitting frames and the receiver can accept the frames already on the wire before the buffer overflows. The switch automatically sets queue buffer thresholds to prevent frame loss.

According to some embodiments, when congestion forces one priority flow on a link to pause, all of the other priority flows on the link continue to send frames. Only frames of the paused priority are not transmitted. When the receive buffer empties below another threshold, the switch sends a message that starts the flow again. However, depending on the amount of traffic on a link or the assigned priority, pausing traffic can cause ingress port congestion and thus eventually spread congestion throughout the network.

Explicit congestion notification (ECN) enables end-to-end congestion notification between two endpoints. ECN is an IP level flag that is used by protocols in the higher layer such as UDP and TCP. The two endpoints are an ECN-enabled sender and an ECN-enabled receiver. In a preferred embodiment, ECN is enabled on both endpoints and on all of the intermediate devices between the endpoints. In some embodiments, where an intermediate device that does not support ECN (i.e., a non-ECN device), the end-to-end ECN functionality may be degraded. It is noted that for non-ECN devices, congestion is detected purely based on the packets dropped by the non-ECN device. ECN notifies networks about congestion with the goal of reducing packet loss and delay by making the sending device decrease the transmission rate until the congestion clears, without dropping packets.

Data Center Quantized Congestion Notification (DC-QCN) is a combination of ECN and PFC to support end-to-end lossless Ethernet. ECN helps overcome the limitations of PFC to achieve lossless Ethernet. The idea behind DC-QCN is to allow ECN to do flow control by decreasing the transmission rate when congestion starts, thereby minimizing the time PFC is triggered, which stops the flow altogether. The correct operation of DC-QCN requires balancing two conflicting requirements: (1) ensuring PFC is not triggered too early, that is, before giving ECN a chance to send congestion feedback to slow the flow, and (2) ensuring PFC is not triggered too late, thereby causing packet loss due to buffer overflow. It is noted that important parameters need to be calculated and configured properly to achieve the above key requirements. Typically, workloads such as general processing unit (GPU) workloads are unable to obtain a desired level of throughput while being executed on a cluster network. One reason for this problem is that the RoCE congestion management running on RDMA network interface cards (NICs) are not optimized i.e., the parameters of various network level devices and NICs on host machines are not optimized so as to increase network throughput. In what follows, there is described a framework that provisions optimal parameter settings for network devices (e.g., host machines, TORs, etc.) while maintaining high levels of throughput.

Figure 11:
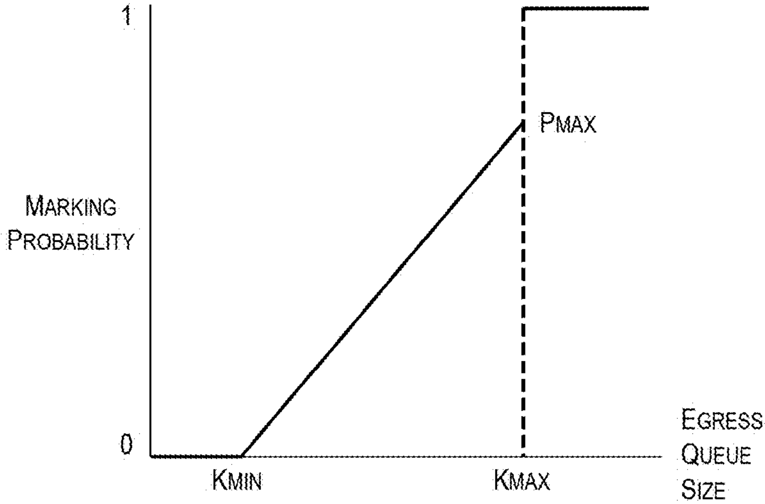
FIG. 11 depicts a schematic illustrating a mechanism utilized for marking explicit congestion notification (ECN) packets, according to certain embodiments.

Turning to FIG. 11, there is depicted a schematic illustrating a mechanism utilized for marking explicit congestion notification (ECN) packets, according to certain embodiments. Specifically, FIG. 11 depicts a schematic illustrating how switches mark ECN packets. As shown in FIG. 11, the x-axis is labeled as an egress queue size of a switch and the y-axis is labeled as marking probability i.e., probability that a given packet will be marked as an ECN packet. By some embodiments, switches e.g., TOR switches, upper layer switches, etc., perform ECN markings using the following three parameters: (1) a minimum threshold parameter ($K_{min}$) defined in terms of segments or packets, (2) a maximum threshold parameter ($K_{max}$) defined in terms of segments or packets, and (3) a marking probability parameter.

In one implementation, a switch monitors a depth of a buffer (i.e., number of segments/packets present in the queue). When the buffer reaches a "minimum" ECN threshold i.e., $K_{min}$, the switch starts to mark the ECN bits of the packets. The marking may be performed in one of two ways: (1) in a random manner (i.e., a probabilistic manner), where the probability of a specific packet being marked is defined by the configured marking probability, or (2) in a deterministic manner, where the probability of marking a packet is 100% based on a certain condition being satisfied.

In the probabilistic manner of marking packets, the switch monitors a depth of a buffer (i.e., number of segments present in the queue/occupancy level of the queue). When the buffer reaches the "minimum" ECN threshold, (i.e., $K_{min}$), the switch starts to mark the ECN bits of the packets. When the buffer reaches a "maximum" ECN Threshold, (i.e., $K_{max}$), the switch marks the ECN bits for up to $P_{max}$% of the packets. Furthermore, in some implementations, when buffer depth exceeds the maximum ECN threshold (i.e., $K_{max}$), 100% of the packets are marked. In between $K_{min}$ and $K_{max}$, the switch linearly increases the % of packets marked from 0% to $P_{max}$% of the packets. In contrast, in the deterministic manner of marking packets, the switch maintains only a single threshold i.e., the switch maintains $K_{min}=K_{max}=K$. In deterministic marking, the switch monitors a depth of a buffer (i.e., number of segments present in the queue) and performs the markings as follows: if depth of the buffer is lower than K, then no packets are marked, whereas if depth of the buffer is greater than K, then all packets are marked with a probability of marking being 100%. By some embodiments, the parameters of the switch e.g., $P_{max}$, $K_{min}$ and $K_{max}$ may be set to specific values (depicted in FIG. 13) in order to obtain an optimal throughput performance. For instance, it was observed that assigning values of $K_{min}$=63,000, $K_{max}$=80,000, and $P_{max}$=20% attained optimal throughout performance i.e., highest performance.

Figure 12:
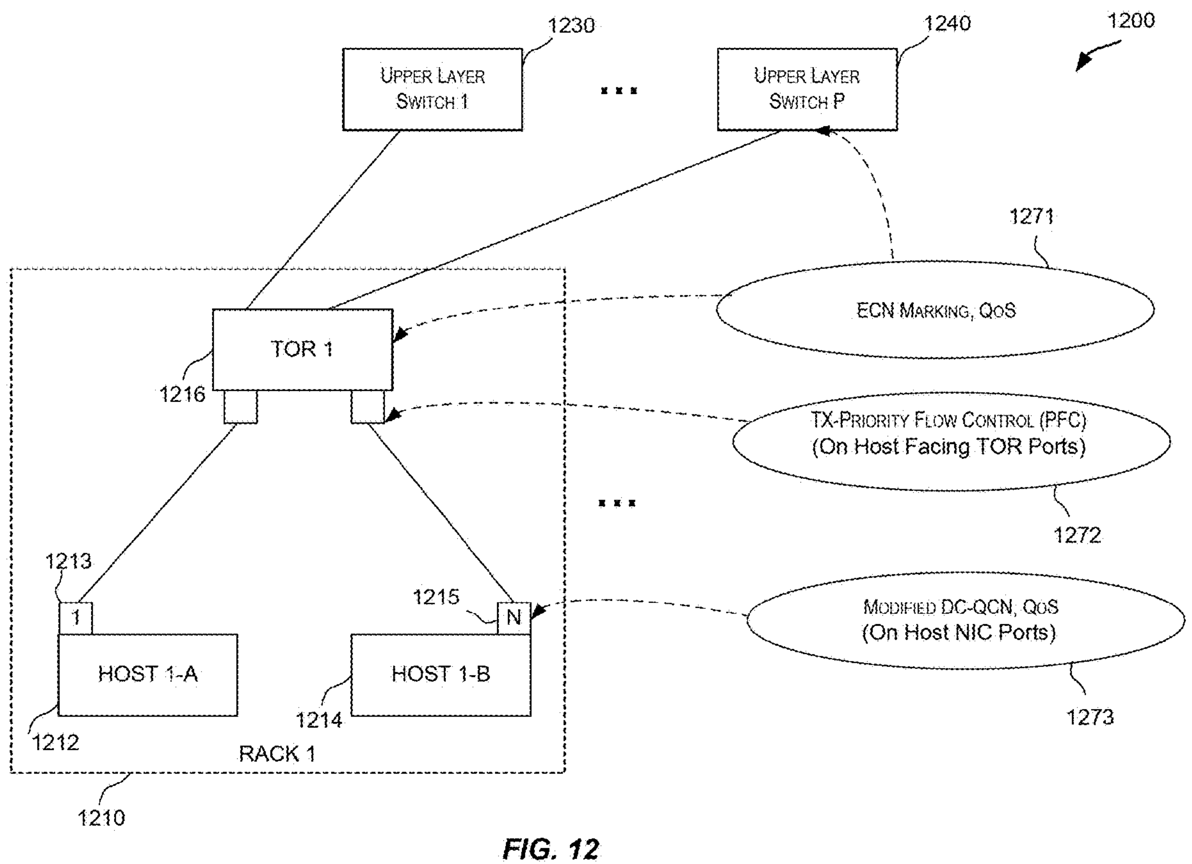
FIG. 12 depicts a schematic identifying network locations in a cloud infrastructure where different parameter markings are applied, according to certain embodiments.

FIG. 12 depicts a schematic 1200 identifying network locations in a cloud infrastructure where different parameter markings are applied, according to certain embodiments. For sake convenience, there is depicted in FIG. 12 a portion of a network cluster. As shown in FIG. 12, the network cluster may include one or more racks e.g., Rack 1, 1210. Each rack may include one or more host machines e.g., Host 1-A 1212 and Host 1-B 1214 included in rack 1 1210. Each host machine may include one or more NIC ports e.g., NIC port 1213 of Host 1-A 1212, and NIC port 1215 of Host 1-B 1214. Each of the NIC ports of the host machines is connected to a host facing port of a top-of-rack (TOR) switch e.g. TOR 1 1216. The TOR switch 1216 in turn is connected to a plurality of upper layer switches e.g., upper layer switch 1 1230, and upper layer switch P, 1240.

According to some embodiments, the TOR switch 1216 as well the plurality of upper layer switches enable ECN markings 1271 as described above. Specifically, if there is any queuing on any ports of these switches, then the switches execute the ECN marking schemes as described previously with reference to FIG. 11. Moreover, the TOR switches and the upper layer switches may execute quality of service (QOS) markings. The QoS markings enable the switches to determine, data packets of which traffic class are to be placed in which queue i.e., the QoS markings enable the switches to perform priority queue placements of data packets e.g., determine which data packet is to be placed on which queue. It is appreciated that such a priority placement of data packets on the respective queues may be performed based on the DSCP bits that are marked at the end host machine by a user. By some embodiments, the TOR and upper layer switches are also configured to allocate highest priority to a management queue e.g., management queue that carries congestion notification packets (CNP) as such a management queue manages end-to-end performance of the network cluster. Further, as shown in FIG. 12, a transmit priority flow control (TxPFC) setting 1272 is executed on TOR ports facing the host machines in a rack, whereas a modified DC-QCN setting 1273 is executed on the NICs (associated with GPUs) included in the host machines in a rack. Details regarding the modified DC-QCN and the TxPFC are described next with reference to FIGS. 14 and 15, respectively.

According to one embodiment, a first solution to address the problem of reduction in throughput caused due to network encapsulation is via a novel congestion control mechanism that is referred to herein as 'Modified DC-QCN' approach. In this approach, upon detecting congestion, a switch (e.g., T0 tier switch) marks explicit congestion notification (ECN) packets, which cause receiving host machines (e.g., a destination host machine) to generate a congestion notification packet (CNP) to be sent to a source host machine i.e., sender of the packet. The sender invokes a modified congestion control mechanism, which is designed to reduce the transmission rate in a manner that is significantly different than the manner in which traditional DC-QCN mechanism operates. Note that the traditional DC-QCN approach reduces the transmission rate in an exponential manner. This causes a significant time delay in ramping up the transmission rate back to the initial transmission rate prior to detecting congestion e.g., full transmission rate of 100%.

In one implementation, in the modified DC-QCN approach of the present disclosure, upon the sender i.e., a source host machine receiving a CNP packet, the sender reduces the transmission rate minimally. For instance, in contrast to typical DC-QCN, where the rate is exponentially reduced upon detection of a first CNP (e.g., by 50%), in the modified version of DC-QCN, the transmission rate is dropped by a small amount e.g., by 1% upon receiving a first instance of the CNP. In other words, the transmission rate is reduced from the initial transmission rate of 100% to 99%. Thus, if no subsequent CNP packet(s) are received in a given time-period (e.g., few milli-seconds such as 5-10 msecs), the transmission rate can be ramped to 100% immediately. However, if one or more other CNPs are detected, the transmission rate is reduced (sequentially) in a stepwise manner i.e., reduction by 2% (upon receiving the second CNP), followed by a reduction of 5% (upon receiving a third CNP) and a further reduction of 10% (upon receiving the fourth CNP). Thus, in this manner, the transmission rate is not reduced exponentially (e.g., 50%) and thus does not take a long time to increase the rate back to 100% upon no detection of CNP packets.

Figure 14:
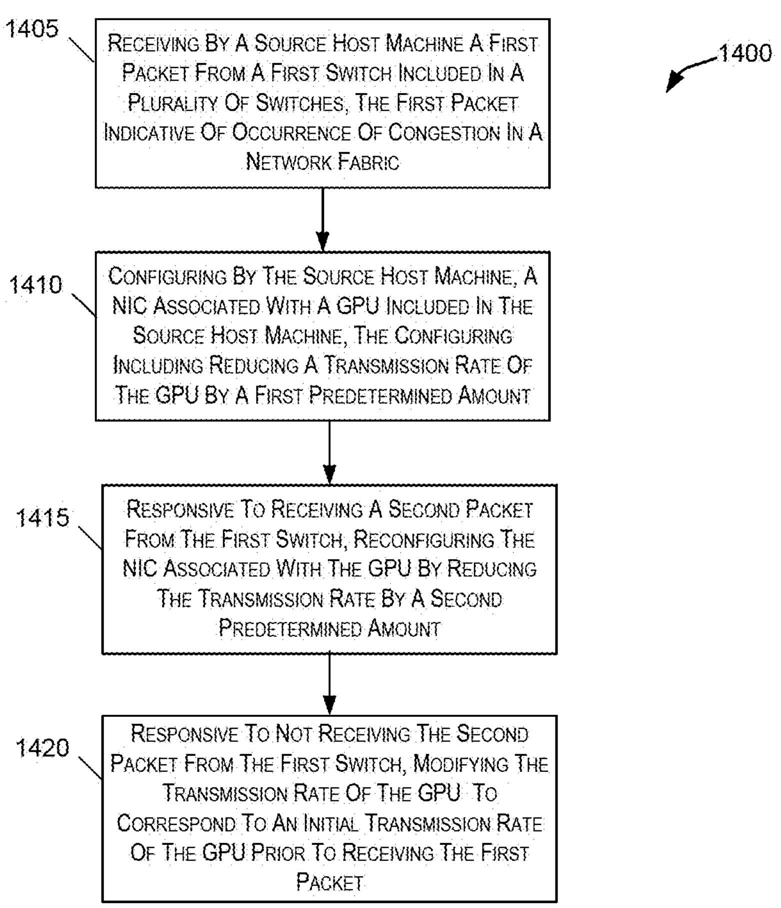
FIG. 14 illustrates an exemplary flowchart depicting steps performed in handling overhead of network overlay encapsulation according to a first embodiment.

FIG. 14 illustrates an exemplary flowchart 1400 depicting steps performed in handling overhead of network overlay encapsulation according to the first embodiment i.e., steps performed by modified DC-QCN approach. The processing depicted in FIG. 14 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method 1400 presented in FIG. 14 and described below is intended to be illustrative and non-limiting. Although FIG. 14 depicts the various processing steps occurring in a particular sequence or order, this is not intended to be limiting. In certain alternative embodiments, the steps may be performed in some different order or some steps may also be performed in parallel. It is appreciated that a control plane of the network infrastructure may be configured to perform the steps depicted in FIG. 14.

The steps depicted in FIG. 14 may be implemented in a network environment that comprises a plurality of host machines, where each host machine is communicatively coupled to other host machines other via a network fabric. Each host machine includes one or more GPUs. In one implementation, the network fabric may comprise a plurality of switches (including a plurality of ports) that are arranged in a hierarchical structure such as a 2-tier CLOS network or a 3-tier CLOS. Considering the 3-tier CLOS network, the network fabric may include a first tier of switches, a second tier of switches, and a third tier of switches. In one implementation, the plurality of host machines is directly coupled to switches included in the first tier of switches. The second tier of switches in turn communicatively couples the first tier of switches to the third tier of switches.

In such a setting and as shown in FIG. 14, the process commences in step 1405, where in the network environment comprising the plurality of host machines that are communicatively coupled to each other via a network fabric comprising a plurality of switches, a source host machine receives a first packet (e.g., a first CNP) from a first switch (e.g. T0 switch that the source host machine is directly coupled to) included in the plurality of switches. The first packet indicates occurrence of congestion in the network fabric.

Upon the source host machine receiving the first packet, the source host machine in step 1410 configures a network interface card associated with a GPU included in the source host machine. In one implementation, the configuring may comprise reducing a transmission rate of the GPU by a first predetermined amount. For example, the first predetermined amount is 1%. Thus, the transmission rate is reduced from an initial transmission rate of 100% (i.e., prior to occurrence of congestion in the network) to a new transmission rate of 99%.

The process then moves to step 1415, where the source host machine in response to receiving a subsequent CNP (e.g., a second packet) from the first switch reconfigures the transmission rate. It is noted that the second packet is indicative of an ongoing presence of congestion in the network fabric. In one implementation, the reconfiguring performed by the source host machine includes reducing the transmission rate of the GPU by a second predetermined amount e.g., reduce transmission rate by 2%.

The process then moves to step 1420, where in response to not receiving the second packet (e.g., in a predetermined time period of a few milliseconds after receiving the first CNP), the source host machine proceeds to modify the transmission rate of the GPU. By some embodiments, the predetermined time period is 300 microseconds. Specifically, by one embodiment, if no CNPs are received subsequent to the first CNP, the source host machine updates the transmission rate to correspond to an initial transmission rate of the GPU (i.e., 100%) prior to receiving the first packet. For sake of completeness, it is noted however that if the source host machine continues to receive a plurality of CNPs after receiving the second CNP e.g., receives a third CNP followed by a fourth CNP (e.g. indicating a further increase in congestion), then by one embodiment, the source host machine is configured to sequentially, further reduce the transmission rate by a third predetermined amount (e.g., 5%) and a fourth predetermined amount (e.g., 10%), respectively.

According to one embodiment, a second solution to address the problem of reduction in throughput caused due to network encapsulation is via a novel flow control mechanism that is referred to herein as 'TxPFC' approach. This approach avoids the usage of congestion control mechanisms such as DCQCN. As such, an immediate advantage incurred by this approach is that upon congestion being detected (e.g., by a T0 tier switch), the host machine (i.e., source host machine) does not have wait for a CNP to be transmitted from a destination host to the source host machine, thereby avoiding the latency incurred in commencing the congestion avoidance process.

In one implementation, the Tx-PFC approach (i.e., Transmit Priority Flow Control) operates as follows: a particular ToR (e.g., a T0 tier switch) monitors a buffer associated with its uplink port. In one case, when the buffer occupancy e.g., number of packets stored in the buffer, exceeds a particular predefined threshold, the ToR switch transmits a control signal (e.g., a first control signal referred to herein as a 'Pause' signal) to the host machine. Doing so, causes the host machine to momentarily stop i.e., cease, transmitting packets. Thus, in contrast to the modified DCQCN approach, where the transmission rate of the host machine is reduced minimally (e.g., by 1%), in the Tx-PFC approach, a source host machine upon receiving the pause signal completely stops transmission of packets for a short time duration. Thereafter, upon a condition being satisfied e.g., buffer occupancy falling below the predefined threshold or lapse of a predetermined time-period, the source host machine resumes transmission (i.e., at full transmission rate of 100%).

Figure 15:
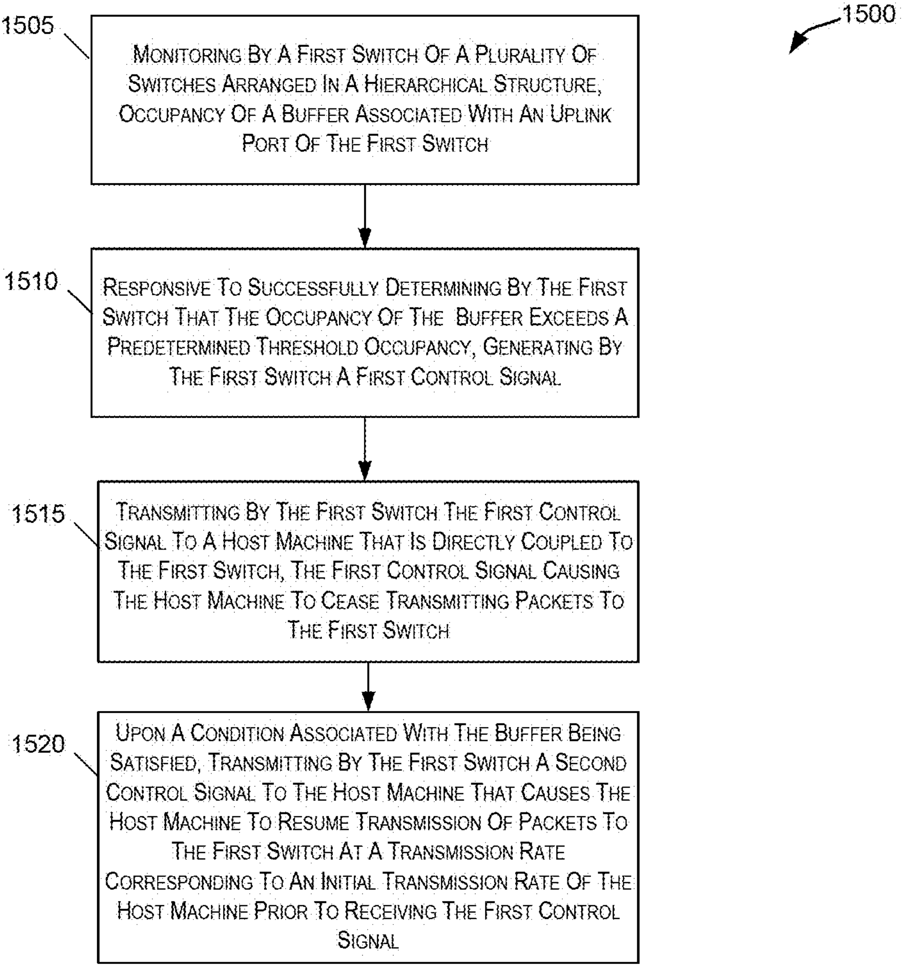
FIG. 15 illustrates an exemplary flowchart depicting steps performed in handling overhead of network overlay encapsulation according to a second embodiment.

FIG. 15 illustrates an exemplary flowchart 1500 depicting steps performed in handling overhead of network overlay encapsulation according to the second embodiment i.e., steps performed by the TxPFC approach. The processing depicted in FIG. 15 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method 1500 presented in FIG. 15 and described below is intended to be illustrative and non-limiting. Although FIG. 15 depicts the various processing steps occurring in a particular sequence or order, this is not intended to be limiting. In certain alternative embodiments, the steps may be performed in some different order or some steps may also be performed in parallel. It is appreciated that a control plane of the network infrastructure may be configured to perform the steps depicted in FIG. 15.

The steps depicted in FIG. 15 may be implemented in a network environment that comprises a plurality of host machines, where each host machine is communicatively coupled to other host machines other via a network fabric. Each host machine includes one or more GPUs. In one implementation, the network fabric may comprise a plurality of switches (including a plurality of ports) that are arranged in a hierarchical structure such as a 2-tier CLOS network or a 3-tier CLOS. Considering the 3-tier CLOS network, the network fabric may include a first tier of switches, a second tier of switches, and a third tier of switches. In one implementation, the plurality of host machines is directly coupled to switches included in the first tier of switches. The second tier of switches in turn communicatively couples the first tier of switches to the third tier of switches.

In such a setting and as shown in FIG. 15, the process commences in step 1505, where a first switch of the plurality of switches (e.g., a T0 tier switch), monitors occupancy of a buffer associated with an uplink port of the first switch. The process then moves to step 1510, where in response to successfully determining by the first switch that the occupancy of the buffer (e.g., number of packets present in the buffer) exceeds a predetermined threshold occupancy, the first switch generates a first control signal (e.g., a 'Pause' signal).

In step 1515, the first switch transmits the first control signal to a host machine that is directly coupled to it. It is appreciated that the first control signal causes the host machine to cease transmitting packets to the first switch. The process then moves to step 1520, where upon a condition associated with the buffer being satisfied, the first switch transmits a second control signal to the host machine. The condition associated with the buffer may correspond to expiration of a timer, occupancy level of the buffer falling below the predetermined threshold occupancy, etc. It is noted that the second control signal causes the host machine to resume transmission of packets to the first switch at a transmission rate that corresponds to an initial transmission rate of the host machine prior to receiving the first control signal i.e., a 100% transmission rate.

Thus, in the manner described above with respect to FIGS. 11-15, the modified DC-QCN as well as the TxPFC approaches provide for addressing the problem of handling network overlay encapsulation without causing adverse impact to the performance of workloads executed on the GPU clusters.

Example Cloud Infrastructure Embodiment

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 16:
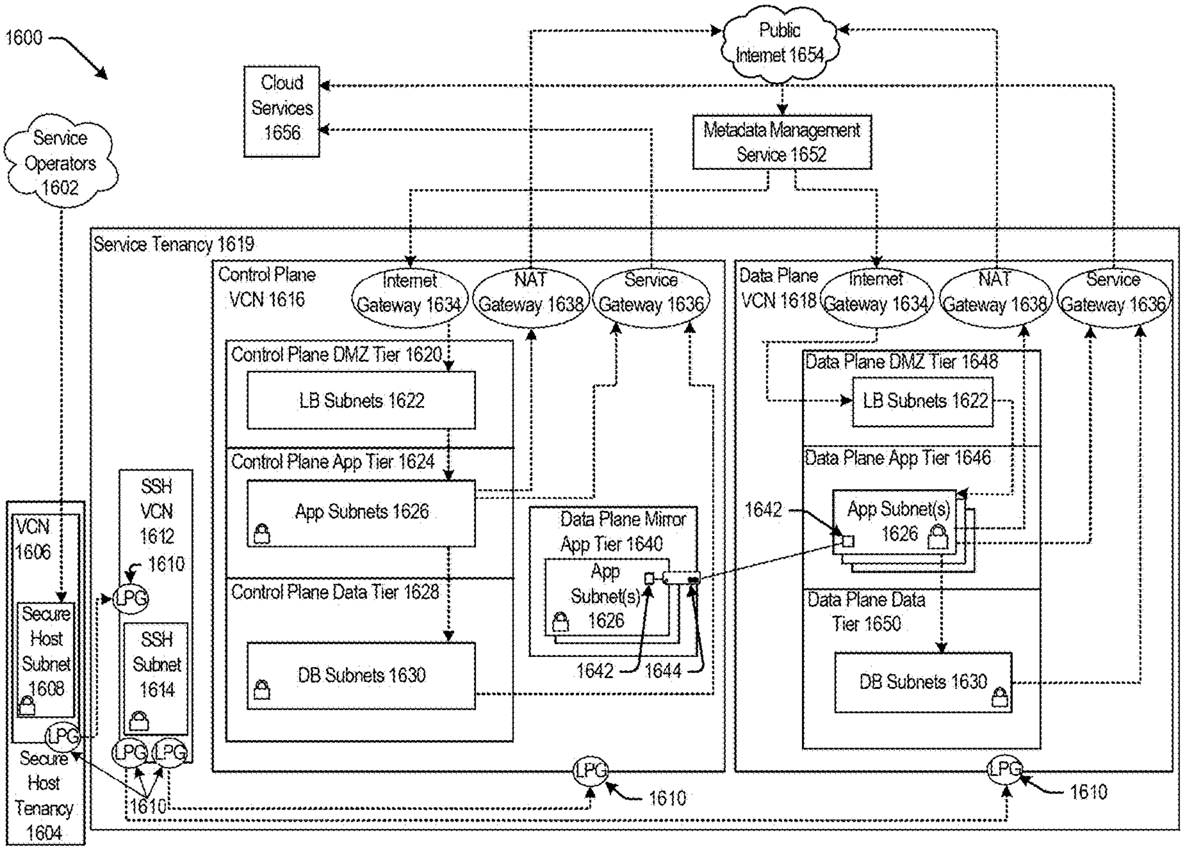
FIG. 16 is a block diagram illustrating one pattern for implementing a cloud infrastructure as a service system, according to at least one embodiment.

FIG. 16 is a block diagram 1600 illustrating an example pattern of an IaaS architecture, according to at least one embodiment. Service operators 1602 can be communicatively coupled to a secure host tenancy 1604 that can include a virtual cloud network (VCN) 1606 and a secure host subnet 1608. In some examples, the service operators 1602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1606 and/or the Internet.

The VCN 1606 can include a local peering gateway (LPG) 1610 that can be communicatively coupled to a secure shell (SSH) VCN 1612 via an LPG 1610 contained in the SSH VCN 1612. The SSH VCN 1612 can include an SSH subnet 1614, and the SSH VCN 1612 can be communicatively coupled to a control plane VCN 1616 via the LPG 1610 contained in the control plane VCN 1616. Also, the SSH VCN 1612 can be communicatively coupled to a data plane VCN 1618 via an LPG 1610. The control plane VCN 1616 and the data plane VCN 1618 can be contained in a service tenancy 1619 that can be owned and/or operated by the IaaS provider.

The control plane VCN 1616 can include a control plane demilitarized zone (DMZ) tier 1620 that acts as a perimeter network (e.g., portions of a corporate network between the corporate intranet and external networks). The DMZ-based servers may have restricted responsibilities and help keep breaches contained. Additionally, the DMZ tier 1620 can include one or more load balancer (LB) subnet(s) 1622, a control plane app tier 1624 that can include app subnet(s) 1626, a control plane data tier 1628 that can include database (DB) subnet(s) 1630 (e.g., frontend DB subnet(s) and/or backend DB subnet(s)). The LB subnet(s) 1622 contained in the control plane DMZ tier 1620 can be communicatively coupled to the app subnet(s) 1626 contained in the control plane app tier 1624 and an Internet gateway 1634 that can be contained in the control plane VCN 1616, and the app subnet(s) 1626 can be communicatively coupled to the DB subnet(s) 1630 contained in the control plane data tier 1628 and a service gateway 1636 and a network address translation (NAT) gateway 1638. The control plane VCN 1616 can include the service gateway 1636 and the NAT gateway 1638.

The control plane VCN 1616 can include a data plane mirror app tier 1640 that can include app subnet(s) 1626. The app subnet(s) 1626 contained in the data plane mirror app tier 1640 can include a virtual network interface controller (VNIC) 1642 that can execute a compute instance 1644. The compute instance 1644 can communicatively couple the app subnet(s) 1626 of the data plane mirror app tier 1640 to app subnet(s) 1626 that can be contained in a data plane app tier 1646.

The data plane VCN 1618 can include the data plane app tier 1646, a data plane DMZ tier 1648, and a data plane data tier 1650. The data plane DMZ tier 1648 can include LB subnet(s) 1622 that can be communicatively coupled to the app subnet(s) 1626 of the data plane app tier 1646 and the Internet gateway 1634 of the data plane VCN 1618. The app subnet(s) 1626 can be communicatively coupled to the service gateway 1636 of the data plane VCN 1618 and the NAT gateway 1638 of the data plane VCN 1618. The data plane data tier 1650 can also include the DB subnet(s) 1630 that can be communicatively coupled to the app subnet(s) 1626 of the data plane app tier 1646.

The Internet gateway 1634 of the control plane VCN 1616 and of the data plane VCN 1618 can be communicatively coupled to a metadata management service 1652 that can be communicatively coupled to public Internet 1654. Public Internet 1654 can be communicatively coupled to the NAT gateway 1638 of the control plane VCN 1616 and of the data plane VCN 1618. The service gateway 1636 of the control plane VCN 1616 and of the data plane VCN 1618 can be communicatively coupled to cloud services 1656.

In some examples, the service gateway 1636 of the control plane VCN 1616 or of the data plane VCN 1618 can make application programming interface (API) calls to cloud services 1656 without going through public Internet 1654. The API calls to cloud services 1656 from the service gateway 1636 can be one-way: the service gateway 1636 can make API calls to cloud services 1656, and cloud services 1656 can send requested data to the service gateway 1636. But, cloud services 1656 may not initiate API calls to the service gateway 1636.

In some examples, the secure host tenancy 1604 can be directly connected to the service tenancy 1619, which may be otherwise isolated. The secure host subnet 1608 can communicate with the SSH subnet 1614 through an LPG 1610 that may enable two-way communication over an otherwise isolated system. Connecting the secure host subnet 1608 to the SSH subnet 1614 may give the secure host subnet 1608 access to other entities within the service tenancy 1619.

The control plane VCN 1616 may allow users of the service tenancy 1619 to set up or otherwise provision desired resources. Desired resources provisioned in the control plane VCN 1616 may be deployed or otherwise used in the data plane VCN 1618. In some examples, the control plane VCN 1616 can be isolated from the data plane VCN 1618, and the data plane mirror app tier 1640 of the control plane VCN 1616 can communicate with the data plane app tier 1646 of the data plane VCN 1618 via VNICs 1642 that can be contained in the data plane mirror app tier 1640 and the data plane app tier 1646.

In some examples, users of the system, or customers, can make requests, for example create, read, update, or delete (CRUD) operations, through public Internet 1654 that can communicate the requests to the metadata management service 1652. The metadata management service 1652 can communicate the request to the control plane VCN 1616 through the Internet gateway 1634. The request can be received by the LB subnet(s) 1622 contained in the control plane DMZ tier 1620. The LB subnet(s) 1622 may determine that the request is valid, and in response to this determination, the LB subnet(s) 1622 can transmit the request to app subnet(s) 1626 contained in the control plane app tier 1624. If the request is validated and requires a call to public Internet 1654, the call to public Internet 1654 may be transmitted to the NAT gateway 1638 that can make the call to public Internet 1654. Metadata that may be desired to be stored by the request can be stored in the DB subnet(s) 1630.

In some examples, the data plane mirror app tier 1640 can facilitate direct communication between the control plane VCN 1616 and the data plane VCN 1618. For example, changes, updates, or other suitable modifications to configuration may be desired to be applied to the resources contained in the data plane VCN 1618. Via a VNIC 1642, the control plane VCN 1616 can directly communicate with, and can thereby execute the changes, updates, or other suitable modifications to configuration to, resources contained in the data plane VCN 1618.

In some embodiments, the control plane VCN 1616 and the data plane VCN 1618 can be contained in the service tenancy 1619. In this case, the user, or the customer, of the system may not own or operate either the control plane VCN 1616 or the data plane VCN 1618. Instead, the IaaS provider may own or operate the control plane VCN 1616 and the data plane VCN 1618, both of which may be contained in the service tenancy 1619. This embodiment can enable isolation of networks that may prevent users or customers from interacting with other users', or other customers', resources.

Also, this embodiment may allow users or customers of the system to store databases privately without needing to rely on public Internet 1654, which may not have a desired level of threat prevention, for storage.

In other embodiments, the LB subnet(s) 1622 contained in the control plane VCN 1616 can be configured to receive a signal from the service gateway 1636. In this embodiment, the control plane VCN 1616 and the data plane VCN 1618 may be configured to be called by a customer of the IaaS provider without calling public Internet 1654. Customers of the IaaS provider may desire this embodiment since database(s) that the customers use may be controlled by the IaaS provider and may be stored on the service tenancy 1619, which may be isolated from public Internet 1654.

Figure 17:
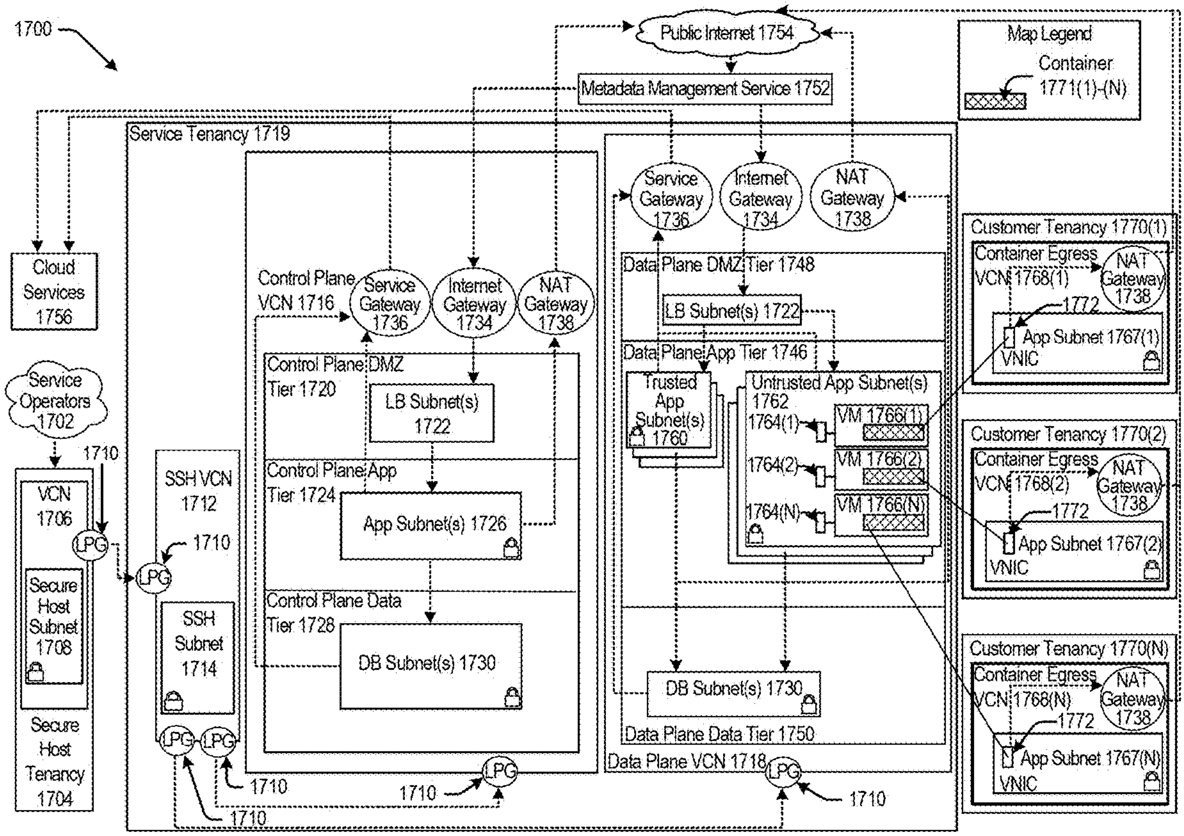
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g., service operators 1602 of FIG. 16) can be communicatively coupled to a secure host tenancy 1704 (e.g., the secure host tenancy 1604 of FIG. 16) that can include a virtual cloud network (VCN) 1706 (e.g., the VCN 1606 of FIG. 16) and a secure host subnet 1708 (e.g., the secure host subnet 1608 of FIG. 16). The VCN 1706 can include a local peering gateway (LPG) 1710 (e.g., the LPG 1610 of FIG. 16) that can be communicatively coupled to a secure shell (SSH) VCN 1712 (e.g., the SSH VCN 1612 of FIG. 16) via an LPG 1610 contained in the SSH VCN 1712. The SSH VCN 1712 can include an SSH subnet 1714 (e.g., the SSH subnet 1614 of FIG. 16), and the SSH VCN 1712 can be communicatively coupled to a control plane VCN 1716 (e.g., the control plane VCN 1616 of FIG. 16) via an LPG 1710 contained in the control plane VCN 1716. The control plane VCN 1716 can be contained in a service tenancy 1719 (e.g., the service tenancy 1619 of FIG. 16), and the data plane VCN 1718 (e.g., the data plane VCN 1618 of FIG. 16) can be contained in a customer tenancy 1721 that may be owned or operated by users, or customers, of the system.

The control plane VCN 1716 can include a control plane DMZ tier 1720 (e.g., the control plane DMZ tier 1620 of FIG. 16) that can include LB subnet(s) 1722 (e.g., LB subnet(s) 1622 of FIG. 16), a control plane app tier 1724 (e.g., the control plane app tier 1624 of FIG. 16) that can include app subnet(s) 1726 (e.g., app subnet(s) 1626 of FIG. 16), a control plane data tier 1728 (e.g., the control plane data tier 1628 of FIG. 16) that can include database (DB) subnet(s) 1730 (e.g., similar to DB subnet(s) 1630 of FIG. 16). The LB subnet(s) 1722 contained in the control plane DMZ tier 1720 can be communicatively coupled to the app subnet(s) 1726 contained in the control plane app tier 1724 and an Internet gateway 1734 (e.g., the Internet gateway 1634 of FIG. 16) that can be contained in the control plane VCN 1716, and the app subnet(s) 1726 can be communicatively coupled to the DB subnet(s) 1730 contained in the control plane data tier 1728 and a service gateway 1736 (e.g., the service gateway 1636 of FIG. 16) and a network address translation (NAT) gateway 1738 (e.g., the NAT gateway 1638 of FIG. 16). The control plane VCN 1716 can include the service gateway 1736 and the NAT gateway 1738.

The control plane VCN 1716 can include a data plane mirror app tier 1740 (e.g., the data plane mirror app tier 1640 of FIG. 16) that can include app subnet(s) 1726. The app subnet(s) 1726 contained in the data plane mirror app tier 1740 can include a virtual network interface controller (VNIC) 1742 (e.g., the VNIC of 1642) that can execute a compute instance 1744 (e.g., similar to the compute instance 1644 of FIG. 16). The compute instance 1744 can facilitate communication between the app subnet(s) 1726 of the data plane mirror app tier 1740 and the app subnet(s) 1726 that can be contained in a data plane app tier 1746 (e.g., the data plane app tier 1646 of FIG. 16) via the VNIC 1742 contained in the data plane mirror app tier 1740 and the VNIC 1742 contained in the data plane app tier 1746.

The Internet gateway 1734 contained in the control plane VCN 1716 can be communicatively coupled to a metadata management service 1752 (e.g., the metadata management service 1652 of FIG. 16) that can be communicatively coupled to public Internet 1754 (e.g., public Internet 1654 of FIG. 16). Public Internet 1754 can be communicatively coupled to the NAT gateway 1738 contained in the control plane VCN 1716. The service gateway 1736 contained in the control plane VCN 1716 can be communicatively coupled to cloud services 1756 (e.g., cloud services 1656 of FIG. 16).

In some examples, the data plane VCN 1718 can be contained in the customer tenancy 1721. In this case, the IaaS provider may provide the control plane VCN 1716 for each customer, and the IaaS provider may, for each customer, set up a unique compute instance 1744 that is contained in the service tenancy 1719. Each compute instance 1744 may allow communication between the control plane VCN 1716, contained in the service tenancy 1719, and the data plane VCN 1718 that is contained in the customer tenancy 1721. The compute instance 1744 may allow resources, that are provisioned in the control plane VCN 1716 that is contained in the service tenancy 1719, to be deployed or otherwise used in the data plane VCN 1718 that is contained in the customer tenancy 1721.

In other examples, the customer of the IaaS provider may have databases that live in the customer tenancy 1721. In this example, the control plane VCN 1716 can include the data plane mirror app tier 1740 that can include app subnet(s) 1726. The data plane mirror app tier 1740 can reside in the data plane VCN 1718, but the data plane mirror app tier 1740 may not live in the data plane VCN 1718. That is, the data plane mirror app tier 1740 may have access to the customer tenancy 1721, but the data plane mirror app tier 1740 may not exist in the data plane VCN 1718 or be owned or operated by the customer of the IaaS provider. The data plane mirror app tier 1740 may be configured to make calls to the data plane VCN 1718 but may not be configured to make calls to any entity contained in the control plane VCN 1716. The customer may desire to deploy or otherwise use resources in the data plane VCN 1718 that are provisioned in the control plane VCN 1716, and the data plane mirror app tier 1740 can facilitate the desired deployment, or other usage of resources, of the customer.

In some embodiments, the customer of the IaaS provider can apply filters to the data plane VCN 1718. In this embodiment, the customer can determine what the data plane VCN 1718 can access, and the customer may restrict access to public Internet 1754 from the data plane VCN 1718. The IaaS provider may not be able to apply filters or otherwise control access of the data plane VCN 1718 to any outside networks or databases. Applying filters and controls by the customer onto the data plane VCN 1718, contained in the customer tenancy 1721, can help isolate the data plane VCN 1718 from other customers and from public Internet 1754.

In some embodiments, cloud services 1756 can be called by the service gateway 1736 to access services that may not exist on public Internet 1754, on the control plane VCN 1716, or on the data plane VCN 1718. The connection between cloud services 1756 and the control plane VCN 1716 or the data plane VCN 1718 may not be live or continuous. Cloud services 1756 may exist on a different network owned or operated by the IaaS provider. Cloud services 1756 may be configured to receive calls from the service gateway 1736 and may be configured to not receive calls from public Internet 1754. Some cloud services 1756 may be isolated from other cloud services 1756, and the control plane VCN 1716 may be isolated from cloud services 1756 that may not be in the same region as the control plane VCN 1716. For example, the control plane VCN 1716 may be located in "Region 1," and cloud service "Deployment 16," may be located in Region 1 and in "Region 2." If a call to Deployment 16 is made by the service gateway 1736 contained in the control plane VCN 1716 located in Region 1, the call may be transmitted to Deployment 16 in Region 1. In this example, the control plane VCN 1716, or Deployment 16 in Region 1, may not be communicatively coupled to, or otherwise in communication with, Deployment 16 in Region 2.

Figure 18:
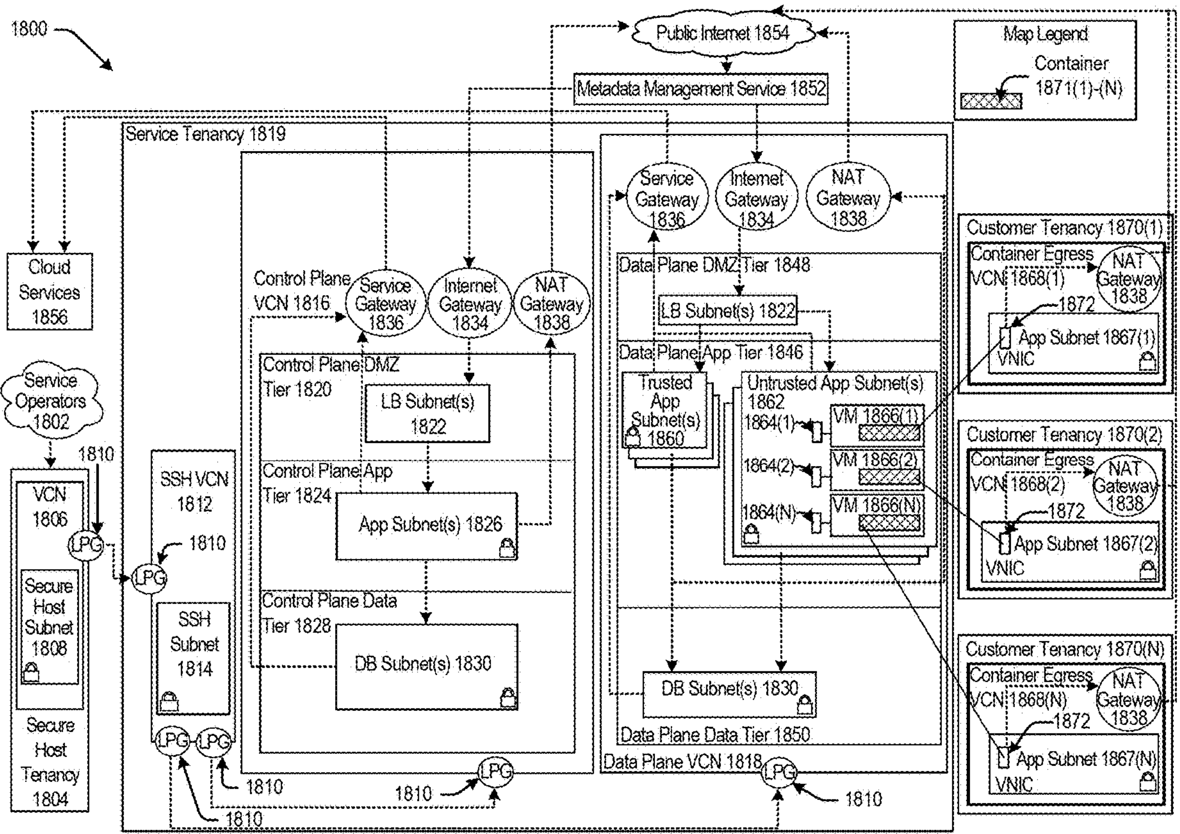
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g., service operators 1602 of FIG. 16) can be communicatively coupled to a secure host tenancy 1804 (e.g., the secure host tenancy 1604 of FIG. 16) that can include a virtual cloud network (VCN) 1806 (e.g., the VCN 1606 of FIG. 16) and a secure host subnet 1808 (e.g., the secure host subnet 1608 of FIG. 16). The VCN 1806 can include an LPG 1810 (e.g., the LPG 1610 of FIG. 16) that can be communicatively coupled to an SSH VCN 1812 (e.g., the SSH VCN 1612 of FIG. 16) via an LPG 1810 contained in the SSH VCN 1812. The SSH VCN 1812 can include an SSH subnet 1814 (e.g., the SSH subnet 1614 of FIG. 16), and the SSH VCN 1812 can be communicatively coupled to a control plane VCN 1816 (e.g., the control plane VCN 1616 of FIG. 16) via an LPG 1810 contained in the control plane VCN 1816 and to a data plane VCN 1818 (e.g., the data plane 1618 of FIG. 16) via an LPG 1810 contained in the data plane VCN 1818. The control plane VCN 1816 and the data plane VCN 1818 can be contained in a service tenancy 1819 (e.g., the service tenancy 1619 of FIG. 16).

The control plane VCN 1816 can include a control plane DMZ tier 1820 (e.g., the control plane DMZ tier 1620 of FIG. 16) that can include load balancer (LB) subnet(s) 1822 (e.g., LB subnet(s) 1622 of FIG. 16), a control plane app tier 1824 (e.g., the control plane app tier 1624 of FIG. 16) that can include app subnet(s) 1826 (e.g., similar to app subnet(s) 1626 of FIG. 16), a control plane data tier 1828 (e.g., the control plane data tier 1628 of FIG. 16) that can include DB subnet(s) 1830. The LB subnet(s) 1822 contained in the control plane DMZ tier 1820 can be communicatively coupled to the app subnet(s) 1826 contained in the control plane app tier 1824 and to an Internet gateway 1834 (e.g., the Internet gateway 1634 of FIG. 16) that can be contained in the control plane VCN 1816, and the app subnet(s) 1826 can be communicatively coupled to the DB subnet(s) 1830 contained in the control plane data tier 1828 and to a service gateway 1836 (e.g., the service gateway of FIG. 16) and a network address translation (NAT) gateway 1838 (e.g., the NAT gateway 1638 of FIG. 16). The control plane VCN 1816 can include the service gateway 1836 and the NAT gateway 1838.

The data plane VCN 1818 can include a data plane app tier 1846 (e.g., the data plane app tier 1646 of FIG. 16), a data plane DMZ tier 1848 (e.g., the data plane DMZ tier 1648 of FIG. 16), and a data plane data tier 1850 (e.g., the data plane data tier 1650 of FIG. 16). The data plane DMZ tier 1848 can include LB subnet(s) 1822 that can be communicatively coupled to trusted app subnet(s) 1860 and untrusted app subnet(s) 1862 of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include one or more primary VNICs 1864(1)-(N) that can be communicatively coupled to tenant virtual machines (VMs) 1866(1)-(N). Each tenant VM 1866(1)-(N) can be communicatively coupled to a respective app subnet 1867(1)-(N) that can be contained in respective container egress VCNs 1868(1)-(N) that can be contained in respective customer tenancies 1870(1)-(N). Respective secondary VNICs 1872(1)-(N) can facilitate communication between the untrusted app subnet(s) 1862 contained in the data plane VCN 1818 and the app subnet contained in the container egress VCNs 1868(1)-(N). Each container egress VCNs 1868(1)-(N) can include a NAT gateway 1838 that can be communicatively coupled to public Internet 1854 (e.g., public Internet 1654 of FIG. 16).

The Internet gateway 1834 contained in the control plane VCN 1816 and contained in the data plane VCN 1818 can be communicatively coupled to a metadata management service 1852 (e.g., the metadata management system 1652 of FIG. 16) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively coupled to cloud services 1856.

In some embodiments, the data plane VCN 1818 can be integrated with customer tenancies 1870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1846. Code to run the function may be executed in the VMs 1866(1)-(N), and the code may not be configured to run anywhere else on the data plane VCN 1818. Each VM 1866(1)-(N) may be connected to one customer tenancy 1870. Respective containers 1871(1)-(N) contained in the VMs 1866(1)-(N) may be configured to run the code. In this case, there can be a dual isolation (e.g., the containers 1871(1)-(N) running code, where the containers 1871(1)-(N) may be contained in at least the VM 1866(1)-(N) that are contained in the untrusted app subnet(s) 1862), which may help prevent incorrect or otherwise undesirable code from damaging the network of the IaaS provider or from damaging a network of a different customer. The containers 1871(1)-(N) may be communicatively coupled to the customer tenancy 1870 and may be configured to transmit or receive data from the customer tenancy 1870. The containers 1871

(1)-(N) may not be configured to transmit or receive data from any other entity in the data plane VCN 1818. Upon completion of running the code, the IaaS provider may kill or otherwise dispose of the containers 1871(1)-(N).

In some embodiments, the trusted app subnet(s) 1860 may run code that may be owned or operated by the IaaS provider. In this embodiment, the trusted app subnet(s) 1860 may be communicatively coupled to the DB subnet(s) 1830 and be configured to execute CRUD operations in the DB subnet(s) 1830. The untrusted app subnet(s) 1862 may be communicatively coupled to the DB subnet(s) 1830, but in this embodiment, the untrusted app subnet(s) may be configured to execute read operations in the DB subnet(s) 1830. The containers 1871(1)-(N) that can be contained in the VM 1866(1)-(N) of each customer and that may run code from the customer may not be communicatively coupled with the DB subnet(s) 1830.

In other embodiments, the control plane VCN 1816 and the data plane VCN 1818 may not be directly communicatively coupled. In this embodiment, there may be no direct communication between the control plane VCN 1816 and the data plane VCN 1818. However, communication can occur indirectly through at least one method. An LPG 1810 may be established by the IaaS provider that can facilitate communication between the control plane VCN 1816 and the data plane VCN 1818. In another example, the control plane VCN 1816 or the data plane VCN 1818 can make a call to cloud services 1856 via the service gateway 1836. For example, a call to cloud services 1856 from the control plane VCN 1816 can include a request for a service that can communicate with the data plane VCN 1818.

Figure 19:
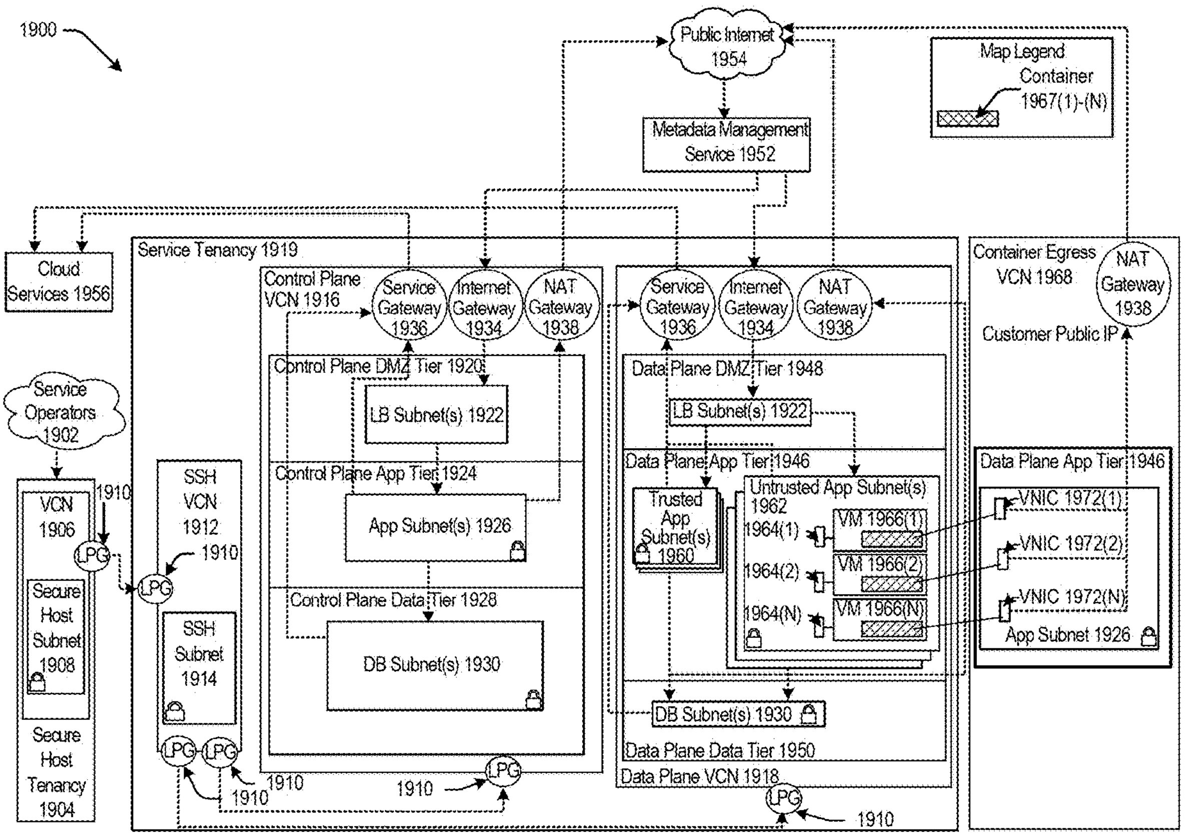
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1602 of FIG. 16) can be communicatively coupled to a secure host tenancy 1904 (e.g., the secure host tenancy 1604 of FIG. 16) that can include a virtual cloud network (VCN) 1906 (e.g., the VCN 1606 of FIG. 16) and a secure host subnet 1908 (e.g., the secure host subnet 1608 of FIG. 16). The VCN 1906 can include an LPG 1910 (e.g., the LPG 1610 of FIG. 16) that can be communicatively coupled to an SSH VCN 1912 (e.g., the SSH VCN 1612 of FIG. 16) via an LPG 1910 contained in the SSH VCN 1912. The SSH VCN 1912 can include an SSH subnet 1914 (e.g., the SSH subnet 1614 of FIG. 16), and the SSH VCN 1912 can be communicatively coupled to a control plane VCN 1916 (e.g., the control plane VCN 1616 of FIG. 16) via an LPG 1910 contained in the control plane VCN 1916 and to a data plane VCN 1918 (e.g., the data plane 1618 of FIG. 16) via an LPG 1910 contained in the data plane VCN 1918. The control plane VCN 1916 and the data plane VCN 1918 can be contained in a service tenancy 1919 (e.g., the service tenancy 1619 of FIG. 16).

The control plane VCN 1916 can include a control plane DMZ tier 1920 (e.g., the control plane DMZ tier 1620 of FIG. 16) that can include LB subnet(s) 1922 (e.g., LB subnet(s) 1622 of FIG. 16), a control plane app tier 1924 (e.g., the control plane app tier 1624 of FIG. 16) that can include app subnet(s) 1926 (e.g., app subnet(s) 1626 of FIG. 16), a control plane data tier 1928 (e.g., the control plane data tier 1628 of FIG. 16) that can include DB subnet(s) 1930 (e.g., DB subnet(s) 1830 of FIG. 18). The LB subnet(s) 1922 contained in the control plane DMZ tier 1920 can be communicatively coupled to the app subnet(s) 1926 contained in the control plane app tier 1924 and to an Internet gateway 1934 (e.g., the Internet gateway 1634 of FIG. 16) that can be contained in the control plane VCN 1916, and the app subnet(s) 1926 can be communicatively coupled to the DB subnet(s) 1930 contained in the control plane data tier 1928 and to a service gateway 1936 (e.g., the service gateway of FIG. 16) and a network address translation (NAT) gateway 1938 (e.g., the NAT gateway 1638 of FIG. 16). The control plane VCN 1916 can include the service gateway 1936 and the NAT gateway 1938.

The data plane VCN 1918 can include a data plane app tier 1946 (e.g., the data plane app tier 1646 of FIG. 16), a data plane DMZ tier 1948 (e.g., the data plane DMZ tier 1648 of FIG. 16), and a data plane data tier 1950 (e.g., the data plane data tier 1650 of FIG. 16). The data plane DMZ tier 1948 can include LB subnet(s) 1922 that can be communicatively coupled to trusted app subnet(s) 1960 (e.g., trusted app subnet(s) 1860 of FIG. 18) and untrusted app subnet(s) 1962 (e.g., untrusted app subnet(s) 1862 of FIG. 18) of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include primary VNICs 1964(1)-(N) that can be communicatively coupled to tenant virtual machines (VMs) 1966(1)-(N) residing within the untrusted app subnet(s) 1962. Each tenant VM 1966(1)-(N) can run code in a respective container 1967(1)-(N), and be communicatively coupled to an app subnet 1926 that can be contained in a data plane app tier 1946 that can be contained in a container egress VCN 1968. Respective secondary VNICs 1972(1)-(N) can facilitate communication between the untrusted app subnet(s) 1962 contained in the data plane VCN 1918 and the app subnet contained in the container egress VCN 1968. The container egress VCN can include a NAT gateway 1938 that can be communicatively coupled to public Internet 1954 (e.g., public Internet 1654 of FIG. 16).

The Internet gateway 1934 contained in the control plane VCN 1916 and contained in the data plane VCN 1918 can be communicatively coupled to a metadata management service 1952 (e.g., the metadata management system 1652 of FIG. 16) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively coupled to cloud services 1956.

In some examples, the pattern illustrated by the architecture of block diagram 1900 of FIG. 19 may be considered an exception to the pattern illustrated by the architecture of block diagram 1800 of FIG. 18 and may be desirable for a customer of the IaaS provider if the IaaS provider cannot directly communicate with the customer (e.g., a disconnected region). The respective containers 1967(1)-(N) that are contained in the VMs 1966(1)-(N) for each customer can be accessed in real-time by the customer. The containers 1967(1)-(N) may be configured to make calls to respective secondary VNICs 1972(1)-(N) contained in app subnet(s) 1926 of the data plane app tier 1946 that can be contained in the container egress VCN 1968. The secondary VNICs 1972(1)-(N) can transmit the calls to the NAT gateway 1938 that may transmit the calls to public Internet 1954. In this example, the containers 1967(1)-(N) that can be accessed in real-time by the customer can be isolated from the control plane VCN 1916 and can be isolated from other entities contained in the data plane VCN 1918. The containers 1967(1)-(N) may also be isolated from resources from other customers.

In other examples, the customer can use the containers 1967(1)-(N) to call cloud services 1956. In this example, the customer may run code in the containers 1967(1)-(N) that requests a service from cloud services 1956. The containers 1967(1)-(N) can transmit this request to the secondary VNICs 1972(1)-(N) that can transmit the request to the NAT gateway that can transmit the request to public Internet 1954. Public Internet 1954 can transmit the request to LB subnet(s) 1922 contained in the control plane VCN 1916 via the Internet gateway 1934. In response to determining the request is valid, the LB subnet(s) can transmit the request to app subnet(s) 1926 that can transmit the request to cloud services 1956 via the service gateway 1936.

It should be appreciated that IaaS architectures 1600, 1700, 1800, 1900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 20:
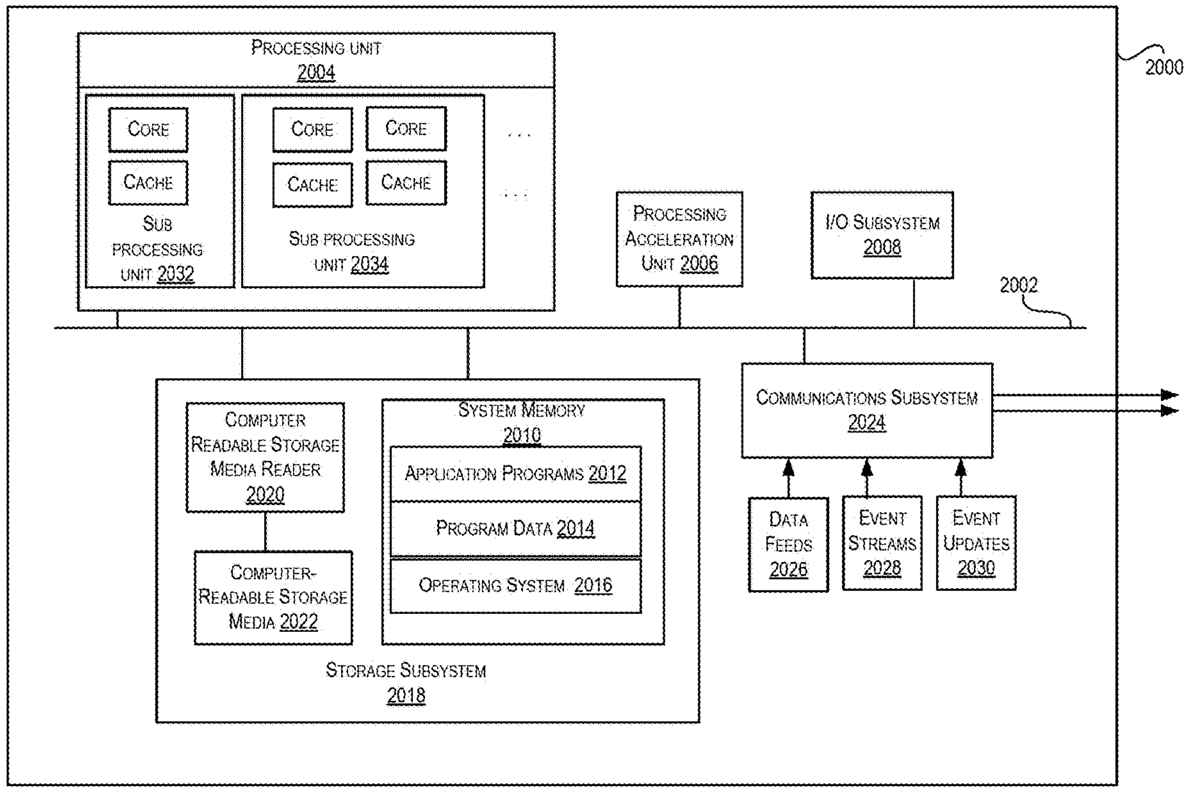
FIG. 20 is a block diagram illustrating an example computer system, according to at least one embodiment.

FIG. 20 illustrates an example computer system 2000, in which various embodiments may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2004 provide the functionality described above. Storage subsystem 2018 may also provide a repository for storing data used in accordance with the present disclosure.

As depicted in the example in FIG. 20, storage subsystem 2018 can include various components including a system memory 2010, computer-readable storage media 2022, and a computer readable storage media reader 2020. System memory 2010 may store program instructions that are loadable and executable by processing unit 2004. System memory 2010 may also store data that is used during the execution of the instructions and/or data that is generated during the execution of the program instructions. Various different kinds of programs may be loaded into system memory 2010 including but not limited to client applications, Web browsers, mid-tier applications, relational database management systems (RDBMS), virtual machines, containers, etc.

System memory 2010 may also store an operating system 2016. Examples of operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2000 executes one or more virtual machines, the virtual machines along with their guest operating systems (GOSs) may be loaded into system memory 2010 and executed by one or more processors or cores of processing unit 2004.

System memory 2010 can come in different configurations depending upon the type of computer system 2000. For example, system memory 2010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 2010 may include a basic input/output system (BIOS) containing basic routines that help to transfer information between elements within computer system 2000, such as during start-up.

Computer-readable storage media 2022 may represent remote, local, fixed, and/or removable storage devices plus storage media for temporarily and/or more permanently containing, storing, computer-readable information for use by computer system 2000 including instructions executable by processing unit 2004 of computer system 2000.

Computer-readable storage media 2022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Machine-readable instructions executable by one or more processors or cores of processing unit 2004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof)), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

in a network environment comprising a plurality of host machines that are communicatively coupled to each other via a network fabric comprising a plurality of switches, receiving, by a source host machine, a first packet from a first switch included in the plurality of switches, the first packet indicative of an occurrence of congestion in the network fabric;

configuring, by the source host machine, in response to receiving the first packet, a network interface card associated with a GPU included in the source host machine, the configuring comprising reducing a transmission rate of the GPU by a first predetermined amount;

responsive to receiving by the source host machine a second packet from the first switch, wherein the second packet indicates presence of congestion in the network fabric, reconfiguring, by the source host machine, the network interface card associated with the GPU, the reconfiguring comprising further reducing the transmission rate of the GPU by a second predetermined amount; and responsive to not receiving the second packet, modifying by the source host machine, the transmission rate of the GPU to correspond to an initial transmission rate of the GPU prior to receiving the first packet.

2. The method of claim 1, wherein the plurality of switches is arranged in a hierarchical structure including a first tier of switches, a second tier of switches, and a third tier of switches, wherein the plurality of host machines is directly coupled to switches included in the first tier of switches, and wherein the second tier of switches communicatively couples the first tier of switches to the third tier of switches.

3. The method of claim 1, further comprising:

responsive to receiving by the source host machine a third packet from the first switch subsequent to the second packet, the third packet indicating an increase in the congestion in the network fabric, reconfiguring, by the source host machine, the network interface card associated with the GPU by further reducing the transmission rate of the GPU by a third predetermined amount.

4. The method of claim 3, further comprising:

responsive to receiving by the source host machine a fourth packet from the first switch subsequent to the third packet, the fourth packet indicating a further increase in the congestion in the network fabric, reconfiguring, by the source host machine, the network interface card associated with the GPU by further reducing the transmission rate of the GPU by a fourth predetermined amount.

5. The method of claim 1, wherein upon receiving the first packet, the transmission rate is reduced by the first predetermined amount of 1%.

6. The method of claim 1, wherein upon receiving the second packet, the transmission rate is further reduced by the second predetermined amount of 2%.

7. The method of claim 4, wherein upon receiving the third packet, the transmission rate is further reduced by the third predetermined amount of 5% and upon receiving the fourth packet, the transmission rate is reduced by 10%.

8. The method of claim 2, wherein the first switch is included in the first tier of switches, and the source host machine is directly coupled to the first switch.

9. The method of claim 1, further comprising:

configuring, a set of parameters associated with the first switch, the configuring including assigning a first threshold parameter associated with a number of packets included in a queue of the first switch a first value, assigning a second threshold parameter associated with the queue of the first switch a second value, and assigning a third parameter corresponding to a probability of marking a third value, and wherein the second value is greater than the first value.

10. The method of claim 9, wherein the first value is set to 63,000, the second value is set to 80,000 and the third value is set to 20%.

11. The method of claim 10, wherein for the number of packets included in the queue of the first switch being greater than the first value and less than the second value, the third value is linearly increased from 0% to 20%.

12. The method of claim 4, wherein each of the first packet, the second packet, the third packet, and the fourth packet is a congestion notification packet that is transmitted by a destination host machine to the source host machine via the first switch.

13. One or more computer readable non-transitory media storing computer-executable instructions that, when executed by one or more processors, cause:

in a network environment comprising a plurality of host machines that are communicatively coupled to each other via a network fabric comprising a plurality of switches, receiving, by a source host machine, a first packet from a first switch included in the plurality of switches, the first packet indicative of an occurrence of congestion in the network fabric;

configuring, by the source host machine, in response to receiving the first packet, a network interface card associated with a GPU included in the source host machine, the configuring comprising reducing a transmission rate of the GPU by a first predetermined amount;

responsive to receiving by the source host machine a second packet from the first switch, wherein the second packet indicates presence of congestion in the network fabric, reconfiguring, by the source host machine, the network interface card associated with the GPU, the reconfiguring comprising further reducing the transmission rate of the GPU by a second predetermined amount; and responsive to not receiving the second packet, modifying by the source host machine, the transmission rate of the GPU to correspond to an initial transmission rate of the GPU prior to receiving the first packet.

14. The one or more computer readable non-transitory media storing computer-executable instructions of claim 13, wherein the plurality of switches is arranged in a hierarchical structure including a first tier of switches, a second tier of switches, and a third tier of switches, wherein the plurality of host machines is directly coupled to switches included in the first tier of switches, and wherein the second tier of switches communicatively couples the first tier of switches to the third tier of switches.

15. The one or more computer readable non-transitory media storing computer-executable instructions of claim 13, further comprising:

responsive to receiving by the source host machine a third packet from the first switch subsequent to the second packet, the third packet indicating an increase in the congestion in the network fabric, reconfiguring, by the source host machine, the network interface card associated with the GPU by further reducing the transmission rate of the GPU by a third predetermined amount.

16. The one or more computer readable non-transitory media storing computer-executable instructions of claim 15, further comprising:

responsive to receiving by the source host machine a fourth packet from the first switch subsequent to the third packet, the fourth packet indicating a further increase in the congestion in the network fabric, reconfiguring, by the source host machine, the network interface card associated with the GPU by further reducing the transmission rate of the GPU by a fourth predetermined amount.

17. The one or more computer readable non-transitory media storing computer-executable instructions of claim 13, wherein upon receiving the first packet, the transmission rate is reduced by the first predetermined amount of 1%.

18. The one or more computer readable non-transitory media storing computer-executable instructions of claim 13, wherein upon receiving the second packet, the transmission rate is further reduced by the second predetermined amount of 2%.

19. A computing device comprising:

one or more processors; and a memory including instructions that, when executed with the one or more processors, cause the computing device to, at least:

in a network environment comprising a plurality of host machines that are communicatively coupled to each other via a network fabric comprising a plurality of switches, receive, by a source host machine, a first packet from a first switch included in the plurality of switches, the first packet indicative of an occurrence of congestion in the network fabric;

configure, by the source host machine, in response to receiving the first packet, a network interface card associated with a GPU included in the source host machine, the configuring comprising reducing a transmission rate of the GPU by a first predetermined amount;

responsive to receiving by the source host machine a second packet from the first switch, wherein the second packet indicates presence of congestion in the network fabric, reconfigure, by the source host machine, the network interface card associated with the GPU by further reducing the transmission rate of the GPU by a second predetermined amount; and responsive to not receiving the second packet, modify by the source host machine, the transmission rate of the GPU to correspond to an initial transmission rate of the GPU prior to receiving the first packet.

20. The computing device of claim 19, wherein the plurality of switches is arranged in a hierarchical structure including a first tier of switches, a second tier of switches, and a third tier of switches, wherein the plurality of host machines is directly coupled to switches included in the first tier of switches, and wherein the second tier of switches communicatively couples the first tier of switches to the third tier of switches.

* * * * *